US011895341B2

(12) United States Patent
Oh et al.

(10) Patent No.: US 11,895,341 B2
(45) Date of Patent: Feb. 6, 2024

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 17/621,042

(22) PCT Filed: Jun. 26, 2020

(86) PCT No.: PCT/KR2020/008327
§ 371 (c)(1),
(2) Date: Dec. 20, 2021

(87) PCT Pub. No.: WO2021/002636
PCT Pub. Date: Jan. 7, 2021

(65) Prior Publication Data
US 2022/0353548 A1    Nov. 3, 2022

Related U.S. Application Data

(60) Provisional application No. 62/870,764, filed on Jul. 4, 2019.

(51) Int. Cl.
*H04N 19/96* (2014.01)
*H04N 19/119* (2014.01)
(Continued)

(52) U.S. Cl.
CPC .......... *H04N 19/96* (2014.11); *H04N 19/119* (2014.11); *H04N 19/174* (2014.11); *H04N 19/30* (2014.11); *H04N 19/46* (2014.11)

(58) Field of Classification Search
CPC .... H04N 19/96; H04N 19/119; H04N 19/174; H04N 19/30; H04N 19/46; H04N 19/597;
(Continued)

(56) References Cited

U.S. PATENT DOCUMENTS

2019/0080483 A1    3/2019  Mammou et al.
2019/0081638 A1    3/2019  Mammou et al.
(Continued)

FOREIGN PATENT DOCUMENTS

WO    WO2019065298    4/2019
WO    WO2019078000    4/2019

OTHER PUBLICATIONS

Extended European Search Report in European Appln. No. 20835101.5, dated Jul. 25, 2022, 7 pages.
(Continued)

*Primary Examiner* — Tat C Chio
(74) *Attorney, Agent, or Firm* — Fish & Richardson P.C.

(57) ABSTRACT

A point cloud data transmission method according to embodiments comprises the steps of: encoding point cloud data including geometry data and attribute data; and transmitting a bitstream including the point cloud data. A point cloud data reception method according to embodiments comprises the steps of: receiving a bitstream including point cloud data including geometry data and attribute data; and decoding the point cloud data.

15 Claims, 30 Drawing Sheets

(51) Int. Cl.
*H04N 19/174* (2014.01)
*H04N 19/30* (2014.01)
*H04N 19/46* (2014.01)

(58) Field of Classification Search
CPC ....... H04N 21/21805; H04N 21/85406; H04N 21/44218; H04N 21/234327; H04N 21/2393; H04N 21/6587; H04N 21/2343; H04N 21/235; H04N 21/236; H04N 21/434; H04N 21/435; G06T 9/001; G06T 9/40; G06T 9/00
See application file for complete search history.

(56) References Cited

U.S. PATENT DOCUMENTS

| | | | |
|---|---|---|---|
| 2021/0119640 A1* | 4/2021 | Mammou | H04N 19/60 |
| 2022/0094982 A1* | 3/2022 | Iguchi | H04N 19/597 |
| 2022/0182670 A1* | 6/2022 | Kuma | H04N 19/85 |

OTHER PUBLICATIONS

Oh, "[G-PCC][New Proposal] Layer structure based PCC slice segmentation," International Organisation for Standardisation, ISO/IEC JTC1/SC29/WG11 MPEG2016/M49198, Jul. 2019, Gothenburg, Sweden, 4 pages.
International Search Report in International Appln. No. PCT/KR2020/008327, dated Jun. 26, 2020, 18 pages (with English translation).
Mammou et al., "G-PCC codec description v2," N18189, ISO/IEC JTC1/SC29/WG11, Marrakech, MA, Jan. 2019, 39 pages.

* cited by examiner

FIG. 6
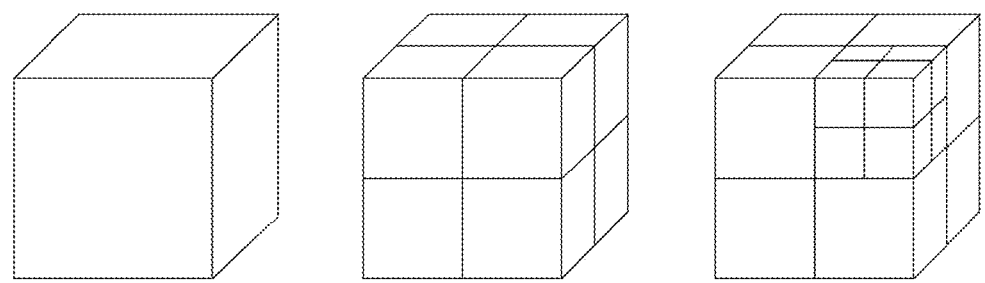
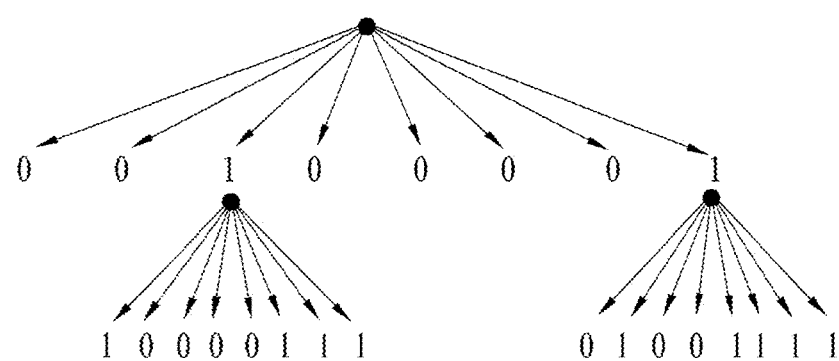

FIG. 7
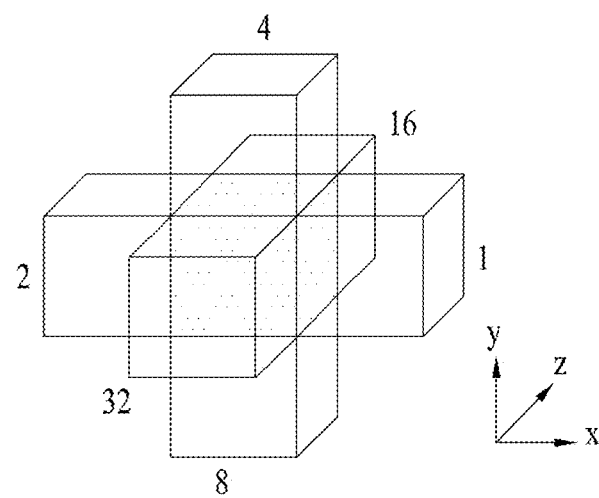
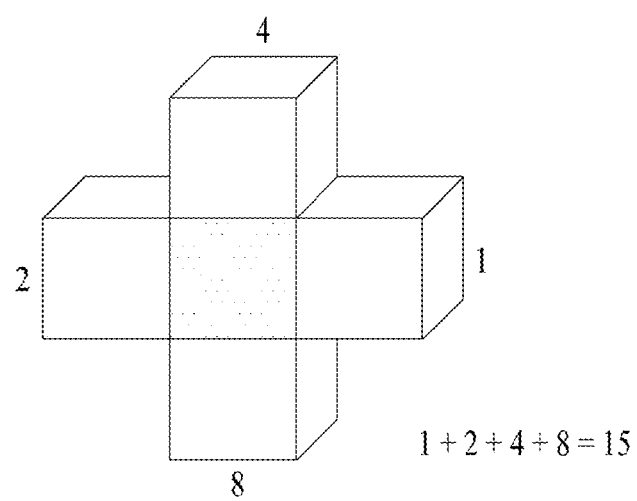
$1 + 2 + 4 + 8 = 15$

FIG. 19

| nal_unit( NumBytesInNalUnit ) { | Descriptor |
|---|---|
|   nal_unit_header( ) | |
|   NumBytesInRbsp = 0 | |
|   for( i = 2; i < NumBytesInNalUnit; i++ ) | |
|     if( i + 2 < NumBytesInNalUnit && next_bits( 24 ) = = 0x000003 ) { | |
|       rbsp_byte[ NumBytesInRbsp++ ] | b(8) |
|       rbsp_byte[ NumBytesInRbsp++ ] | b(8) |
|       i += 2 | |
|       emulation_prevention_three_byte /* equal to 0x03 */ | f(8) |
|     } else | |
|       rbsp_byte[ NumBytesInRbsp++ ] | b(8) |
| } | |

FIG. 20

| nal_unit_header( ) { | Descriptor |
|---|---|
| nuh_spatial_id_plus1 | u(4) |
| nal_unit_type | u(5) |
| nuh_layer_id_plus1 | u(6) |
| nuh_reserved_zero_bit | u(1) |
| } | |

FIG. 21

| nal_unit_type | Name of NalUnitType | Content of NAL unit and RBSP syntax structure | NAL unit type class |
|---|---|---|---|
| 0 | SPS_NUT | Sequence parameter set<br>seq_parameter_set_rbsp( ) | non-CL |
| 1 | TPS_NUT | Tile parameter Set<br>tile_parameter_set_rbsp() | non-CL |
| 2 | GPS_NUT | Geometry parameter set<br>geometry_parameter_set_rbsp() | non-CL |
| 3 | APS_NUT | Attribute parameter set<br>attribute_parameter_set_rbps() | non-CL |
| 4 | AUD_NUT | Access unit delimiter<br>access_unit_delimiter_rbsp( ) | non-CL |
| 5<br>6 | PREFIX_SEI_NUT<br>SUFFIX_SEI_NUT | Supplemental enhancement information<br>sei_rbsp( ) | non-CL |
| 7 | EOS_NUT | End of sequence<br>end_of_seq_rbsp( ) | non-CL |
| 8 | EOB_NUT | End of bitstream<br>end_of_bitstream_rbsp( ) | non-CL |
| 9..15 | RSV_NCL9..<br>RSV_NCL15 | Reserved | non-CL |
| 16 | IDG_NUT | Coded slice of a independent decodable geometry<br>slice_layer_rbsp( ) | GCL |
| 17 | DG_NUT | Coded slice of a dependent geometry<br>slice_layer_rbsp( ) | GCL |
| 18 | IDA_NUT | Coded slice of a independent decodable attribute<br>slice_layer_rbsp( ) | ACL |
| 19 | DA_NUT | Coded slice of a dependent attribute<br>slice_layer_rbsp( ) | ACL |
| 20..27 | RSV_NVCL20..<br>RSV_NVCL27 | Reserved | CL |
| 28..31 | UNSPEC28..<br>UNSPEC31 | Unspecified | CL |

FIG. 22

| seq_parameter_set( ) { | Descriptor |
|---|---|
| profile_compatibility_flags | u(24) |
| level_idc | u(8) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } | |
| sps_source_scale_factor | u(32) |
| sps_seq_parameter_set_id | ue(v) |
| sps_num_attribute_sets | ue(v) |
| for( i = 0; i< sps_num_attribute_sets; i++ ) { | |
| attribute_dimension[ i ] | ue(v) |
| attribute_instance_id[ i ] | ue(v) |
| attribute_bitdepth[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| sps_slice_segment_flag | |
| if ( sps_slice_segment_flag ) | |
| sps_synchronous_geom_attr_segment_flag | |
| sps_extension_present_flag | u(1) |
| if( sps_extension_present_flag ) | |
| while( more_data_in_byte_stream( ) ) | |
| sps_extension_data_flag | u(1) |
| byte_alignment( ) | |
| } | |

FIG. 23

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| if( gps_box_present_flag ){ | |
| gps_gsh_box_log2_scale_present_flag | u(1) |
| if( gps_gsh_box_log2_scale_present_flag == 0 ) | |
| gps_gsh_box_log2_scale | ue(v) |
| } | |
| unique_geometry_points_flag | u(1) |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| if(sps_slice_partitioning_flag ) { | |
| gps_max_spatial_id | u(8) |
| gps_max_geom_layer_idx | u(8) |
| for( i=0; i<= gps_max_spatial_id; i++ ) { | |
| gps_geom_layer_idx_[i] | u(8) |
| } | |
| } | |
| gps_extension_present_flag | u(1) |
| if( gps_extension_present_flag ) | |
| while( more_data_in_byte_stream( ) ) | |
| gps_extension_data_flag | u(1) |
| byte_alignment( ) | |
| } | |

FIG. 24

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| aps_attr_initial_qp | ue(v) |
| aps_attr_chroma_qp_offset | se(v) |
| aps_slice_qp_delta_present_flag | u(1) |
| isLifting = ( attr_coding_type == 0 || attr_coding_type == 2 ) ? 1 : 0 | |
| if( isLifting ) { | |
| lifting_num_pred_nearest_neighbours | ue(v) |
| lifting_max_num_direct_predictors | ue(v) |
| lifting_search_range | ue(v) |
| lifting_lod_regular_sampling_enabled_flag | u(1) |
| lifting_num_detail_levels_minus1 | ue(v) |
| for( idx = 0; idx <= num_detail_levels_minus1; idx++ ) { | |
| if ( lifting_lod_decimation_enabled_flag ) | |
| lifting_sampling_period[ idx ] | ue(v) |
| else | |
| lifting_sampling_distance_squared[ idx ] | ue(v) |
| } | |
| } | |
| if( attr_coding_type == 0 ) | |
| lifting_adaptive_prediction_threshold | ue(v) |
| lifting_intra_lod_prediction_num_layers | ue(v) |
| } | |
| if( !sps_synchronous_geom_attr_segment_flag) { | |
| aps_max_spatial_id | u(8) |
| aps_max_attr_layer_idx | u(8) |
| for( i=0; i<= aps_max_spatial_id; i++) { | |
| aps_attr_layer_idx_[i] | u(8) |
| } | |
| } | |
| aps_extension_present_flag | u(1) |
| if( aps_extension_present_flag ) | |
| while( more_data_in_byte_stream( ) ) | |
| aps_extension_data_flag | u(1) |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2020/008327, filed on Jun. 26, 2020, which claims the benefit of U.S. Provisional Application No. 62/870,764, filed on Jul. 4, 2019. The disclosures of the prior applications are incorporated by reference in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, in some embodiments, a method for transmitting point cloud data may include encoding the point cloud data including geometry information and attribute information, and transmitting a bitstream including the encoded point cloud data.

In some embodiments, a method for receiving point cloud data may include receiving a bitstream including the point cloud data, and decoding the point cloud data including geometry information and attribute information.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. In the drawings:

FIG. 6 shows an example of an octree and occupancy code according to embodiments;

FIG. 7 shows an example of a neighbor node pattern according to embodiments;

FIG. 19 shows a PCC NAL (network abstract layer) unit according to embodiments;

FIG. 20 shows a header of a NAL unit according to embodiments;

FIG. 21 shows types of NAL unit according to embodiments;

FIG. 22 shows a sequence parameter set according to embodiments;

FIG. 23 shows geometry_parameter_set according to embodiments;

FIG. 24 shows an attribute parameter set (attribute_parameter_set( )) according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
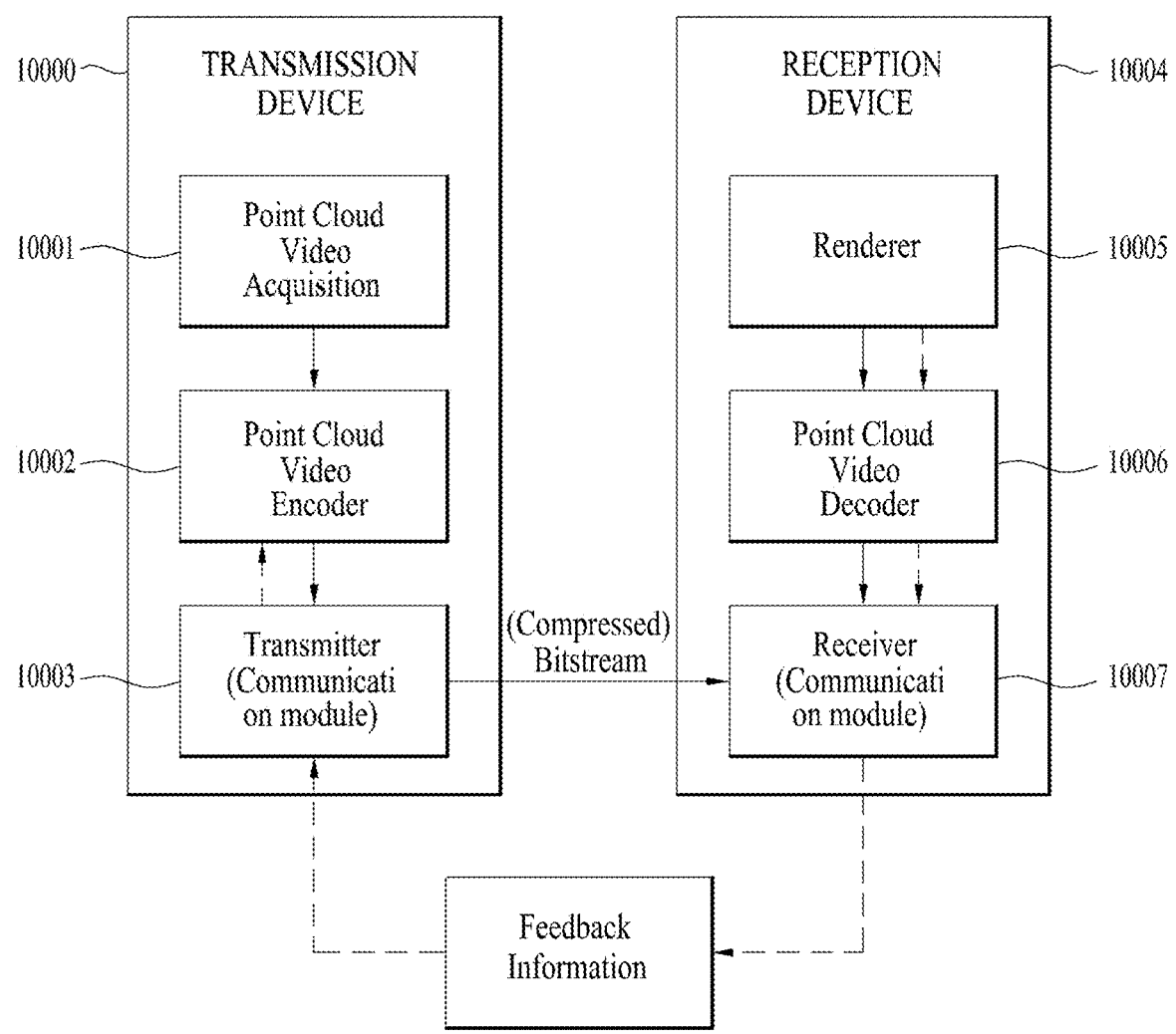
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
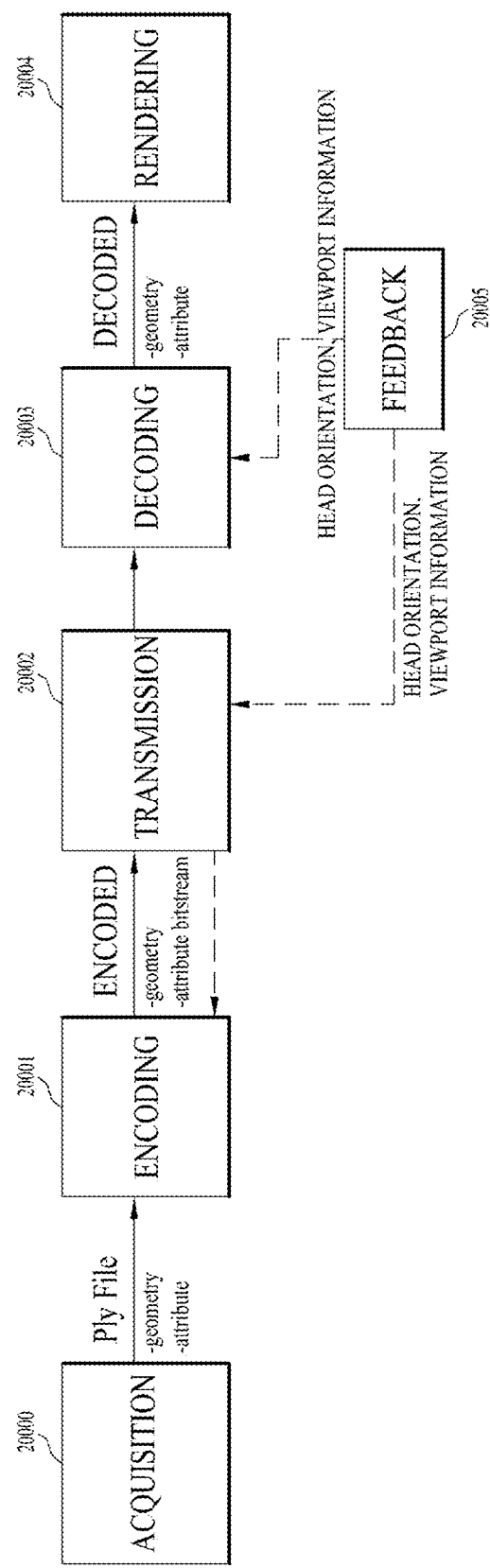
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
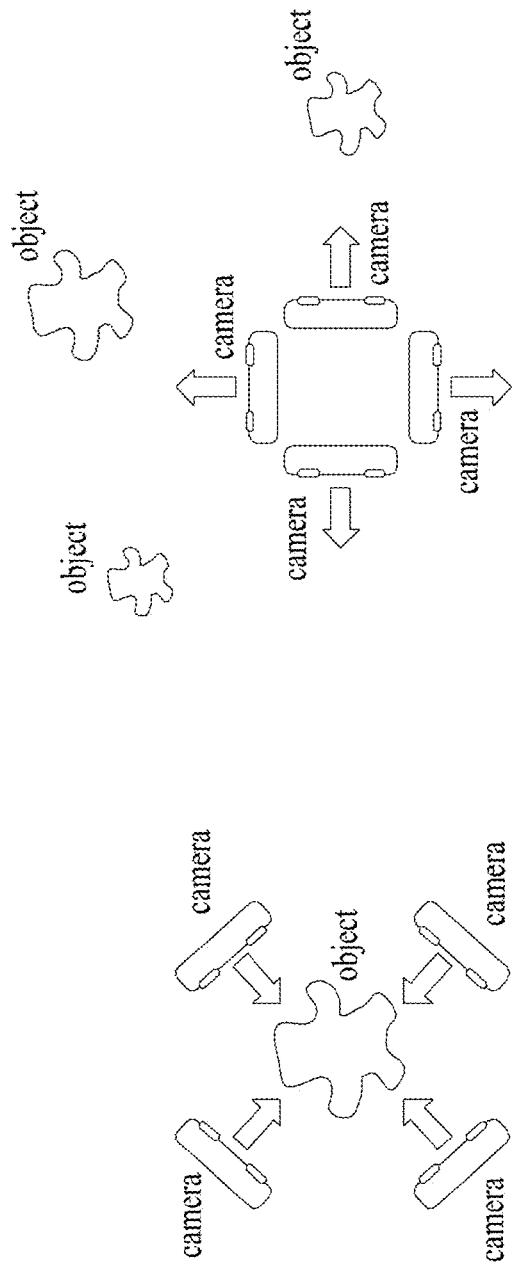
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
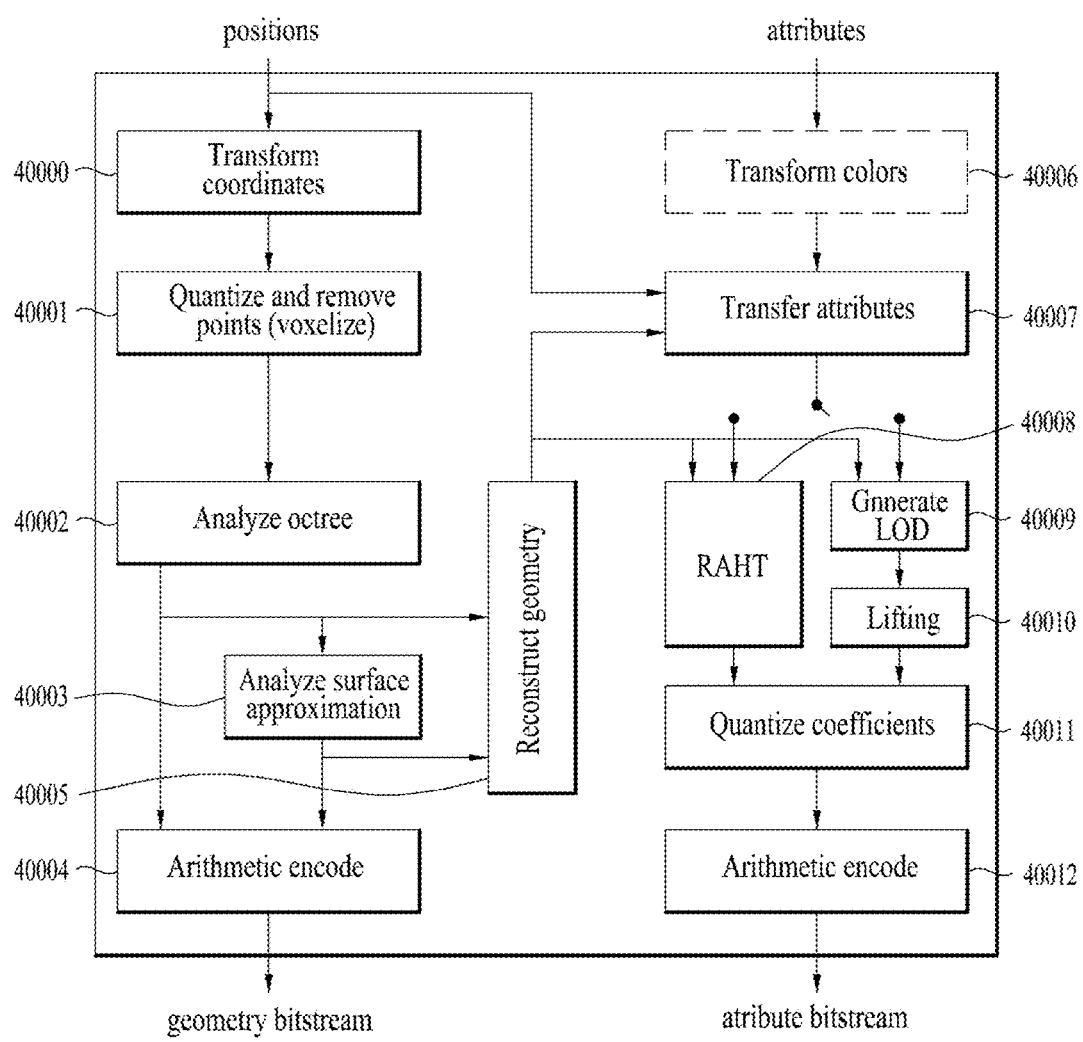
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x,y,z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
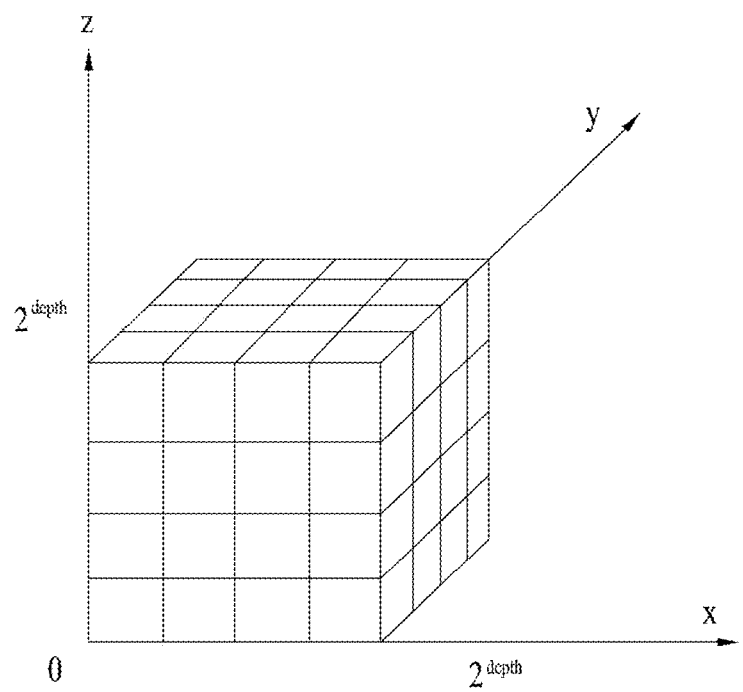
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x,y,z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: 1) calculating the centroid value of each vertex, 2) subtracting the center value from each vertex value, and 3) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix} \quad 1)$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad 2)$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad 3)$$

The minimum value of the sum is estimated, and the projection process is performed according to the axis with the minimum value. For example, when the element x is the minimum, each vertex is projected on the x-axis with respect to the center of the block, and projected on the (y,z) plane. When the values obtained through projection on the (y,z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| n | Triangles formed from vertices ordered 1, . . . , n triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. According to the embodiments, the point cloud encoder may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 8 (=$2^3$) methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
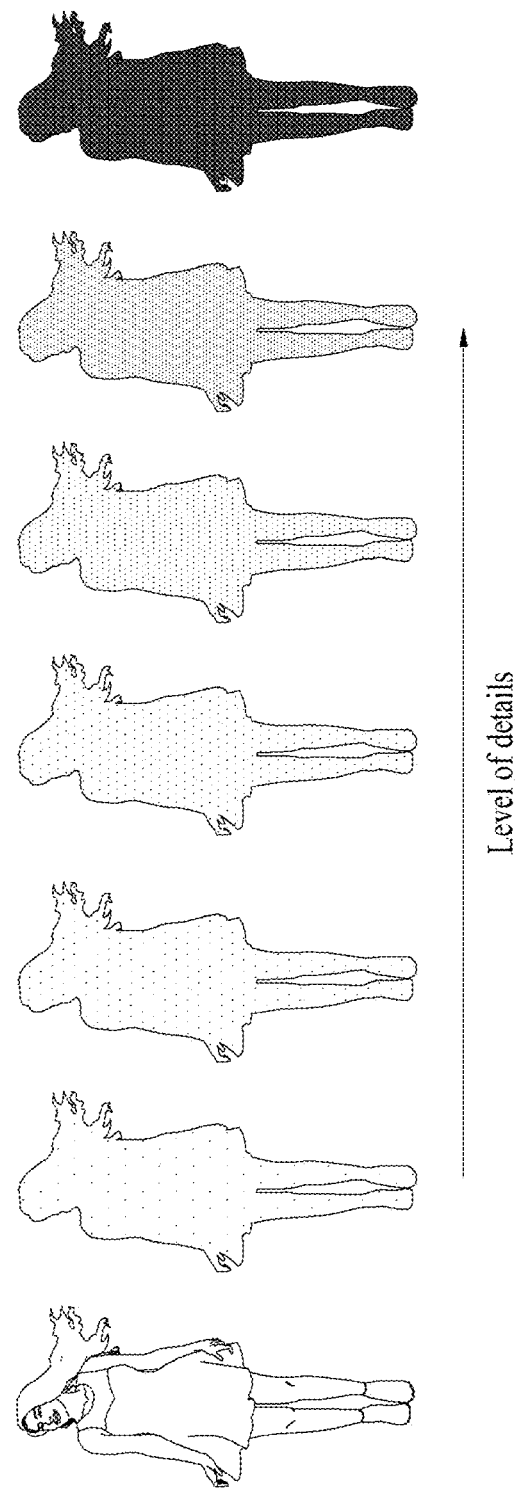
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
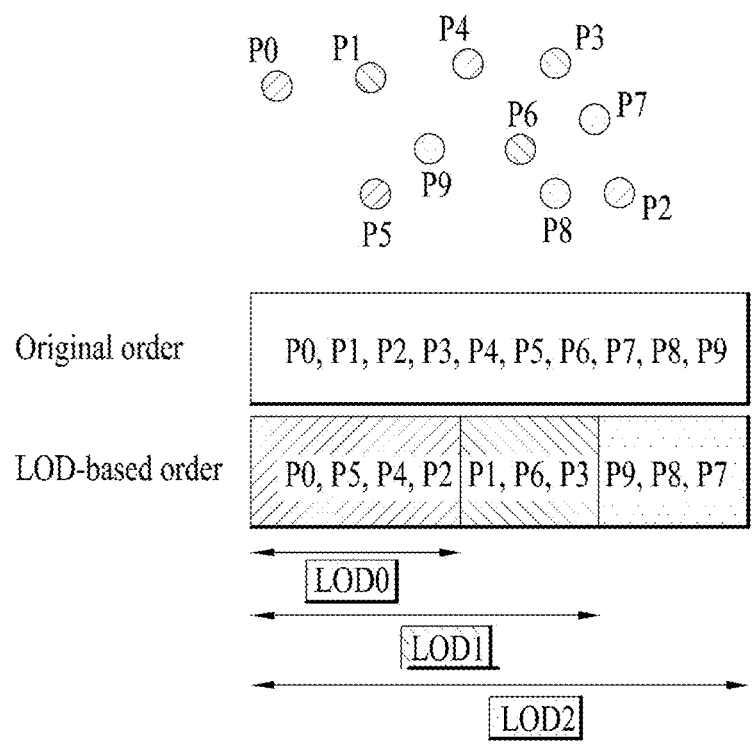
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code
int PCCQuantization(int value, int quantStep) {
if( value >=0) {
return floor(value / quantStep + 1.0 / 3.0);
} else {
return -floor(-value / quantStep + 1.0 / 3.0);
}
}
TABLE Attribute prediction residuals inverse quantization pseudo code
int PCCInverseQuantization(int value, int quantStep) {
if( quantStep ==0) {
return value;
} else {
return value * quantStep;
}
}

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1w2}\begin{bmatrix} g_{l_{2x,y,z}} \\ g_{l_{2x+1,y,z}} \end{bmatrix} \quad T_{w1w2} = \frac{1}{\sqrt{w1+w2}}\begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x,y,z}}$. The root node is created through the $g1_{0,0,0}$ and $g1_{001}$ as follows.

$$\begin{bmatrix} gDC \\ h0_{0,0,0} \end{bmatrix} = T_{w1000w1001}\begin{bmatrix} g1_{0,0,0z} \\ g1_{0,0,1} \end{bmatrix}$$

The value of gDC is also quantized and subjected to entropy coding like the high-pass coefficients.

Figure 10:
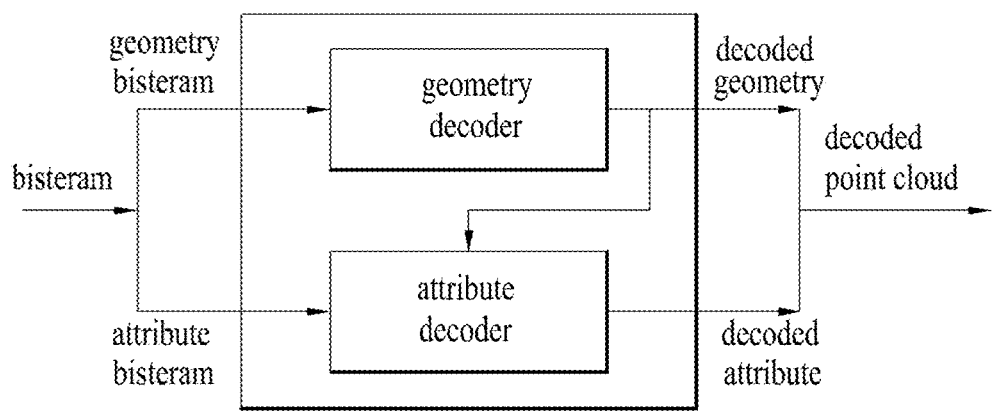
FIG. 10 illustrates an exemplary point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
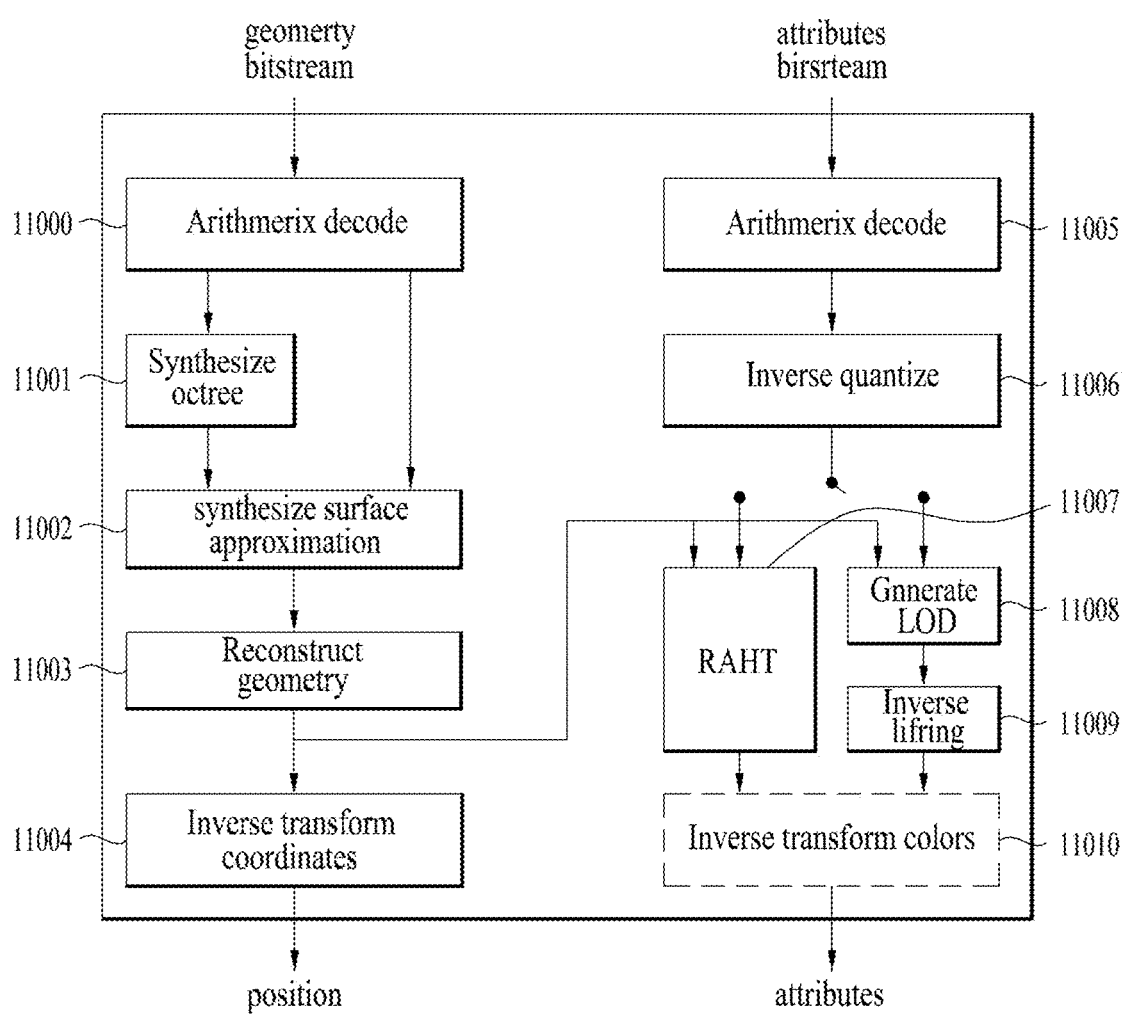
FIG. 11 illustrates an exemplary point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process of the encoding operation of the point cloud encoder described with reference to FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as the reverse of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
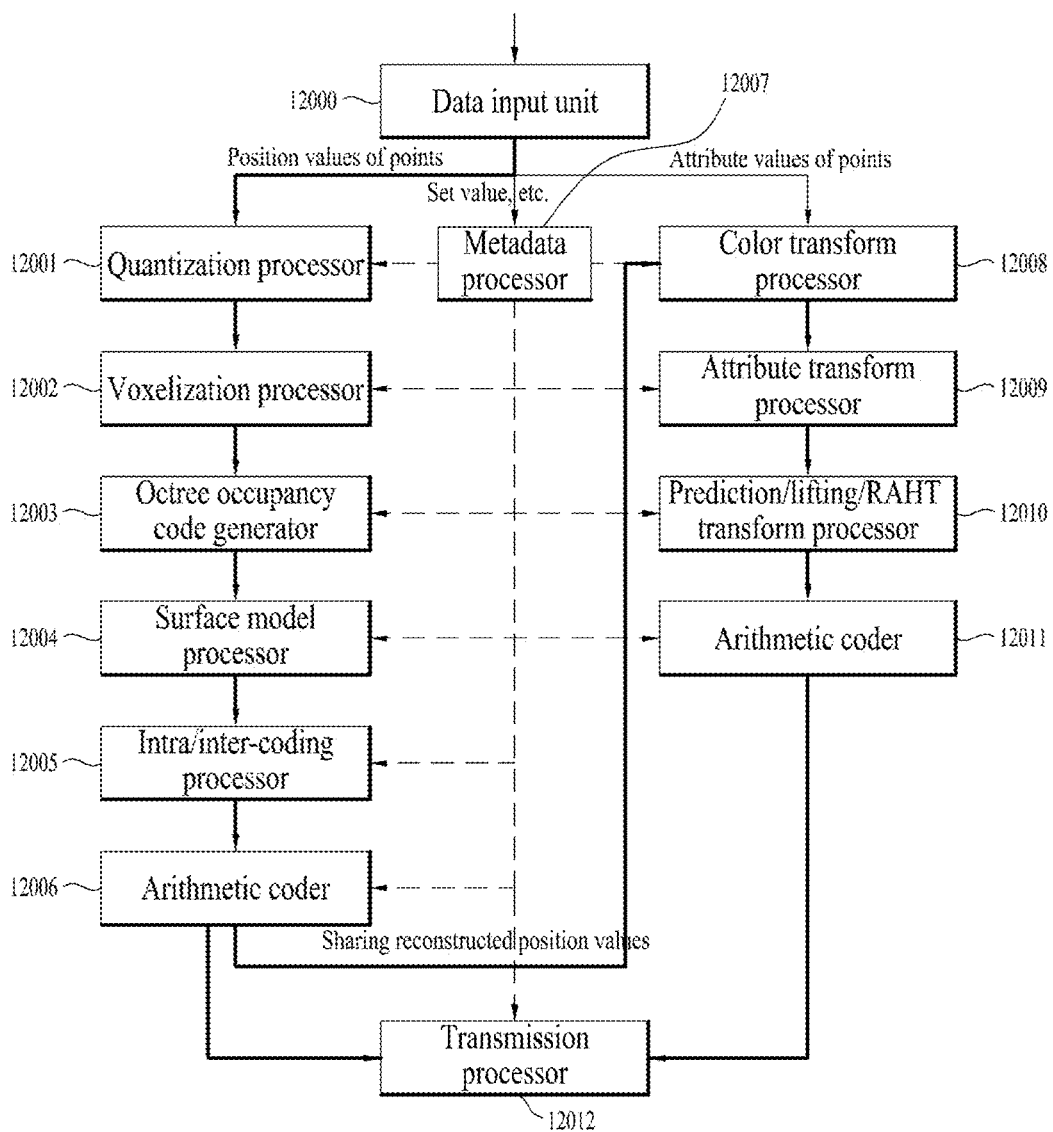
FIG. 12 illustrates an exemplary transmission device according to embodiments.

FIG. 12 illustrates an exemplary transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

A slice is a series of syntax elements representing some or all of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same or similar to the operation and/or transmission method of the transmitter 10003. Details are the same as those described with reference to FIGS. 1 and 2, and thus a description thereof is omitted.

Figure 13:
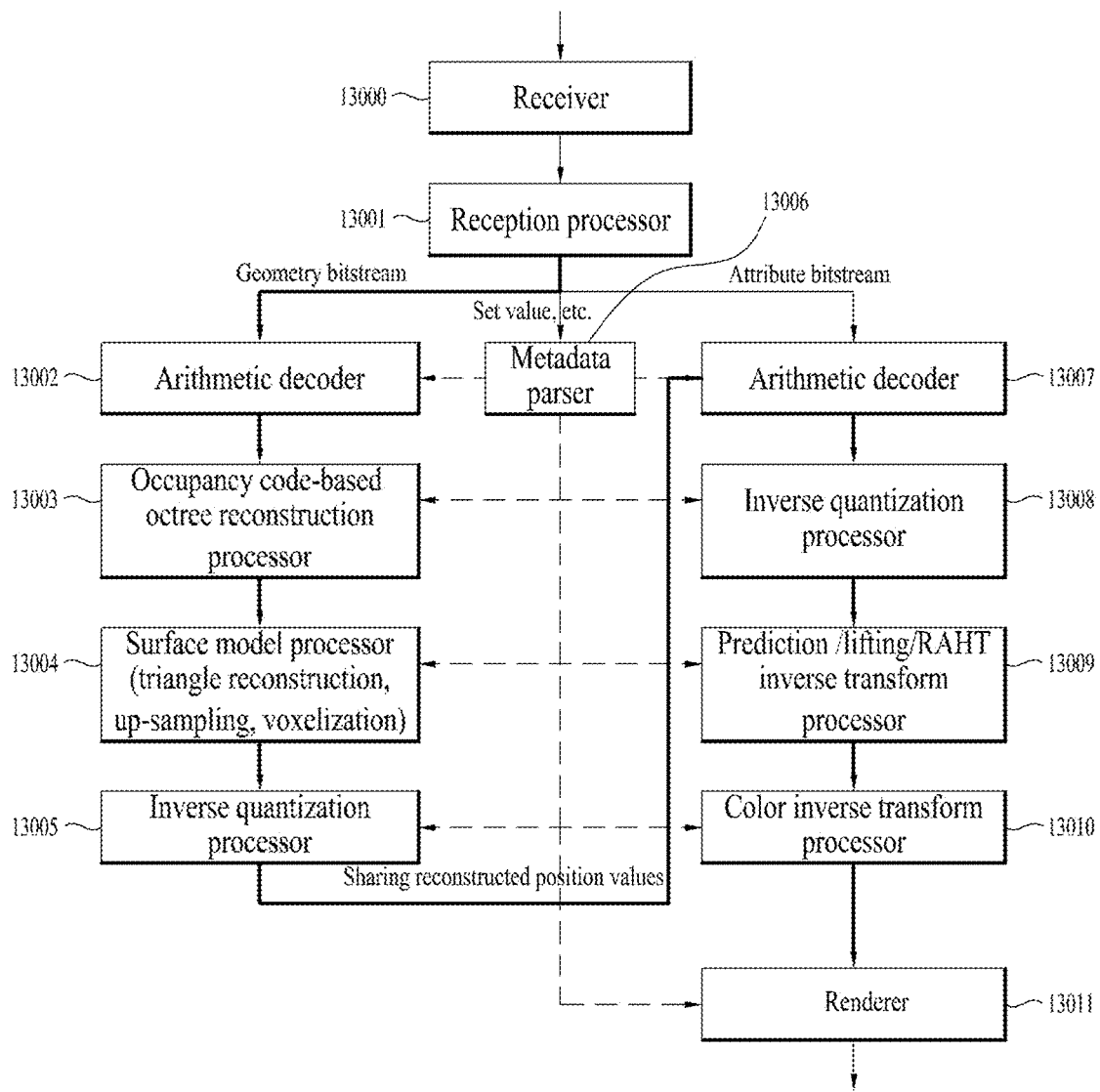
FIG. 13 illustrates an exemplary reception device according to embodiments.

FIG. 13 illustrates an exemplary reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform the reverse of the operation of a corresponding element for encoding according to the embodiments.

The receiver 13000 according to the embodiments receives point cloud data. The receiver 13000 may perform an operation and/or reception method the same or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same or similar to the operation and/or inverse transform coding of the color inverse transformer 11010. The renderer 13011 according to the embodiments may render the point cloud data.

Figure 14:
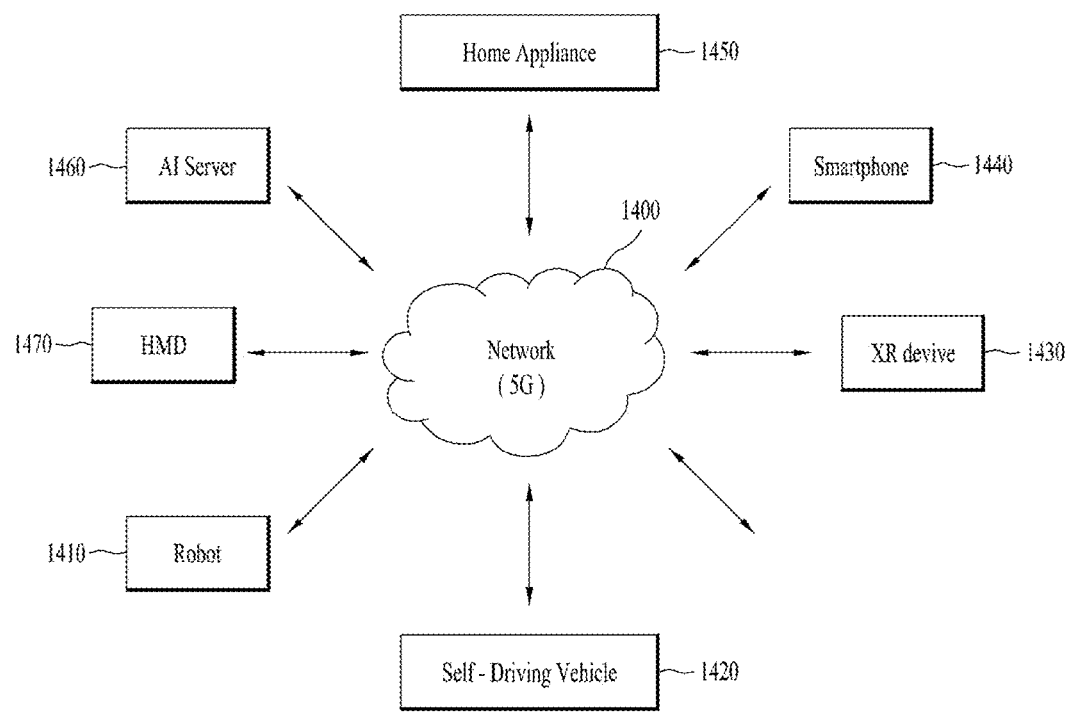
FIG. 14 shows an exemplary structure operatively connectable to a method/device for transmitting and receiving point cloud data according to embodiments.

FIG. 14 shows an exemplary structure operatively connectable to a method/device for transmitting and receiving point cloud data according to embodiments.

The structure of FIG. 14 represents a configuration in which at least one of a server 1460, a robot 1410, a self-driving vehicle 1420, an XR device 1430, a smartphone 1440, a home appliance 1450, and/or an HMD 1470 is connected to a cloud network 1400. The robot 1410, the self-driving vehicle 1420, the XR device 1430, the smartphone 1440, or the home appliance 1450 is referred to as a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, a 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist at least a part of the processing of the connected devices 1410 to 1470.

The HMD 1470 represents one of the implementation types of the XR device and/or the PCC device according to the embodiments. According to embodiments, an HMD type device includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission/reception device according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object to the recognized object and output the matched XR object.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent an autonomous vehicle provided with means for providing an XR image, or an autonomous vehicle that is a target of control/interaction in the XR image. In particular, the self-driving vehicle 1420, which is a target of control/interaction in the XR image, may be distinguished from the XR device 1430 and may be operatively connected thereto.

The self-driving vehicle 1420 having means for providing an XR/PCC image may acquire sensor information from the sensors including a camera, and output the generated XR/PCC image based on the acquired sensor information. For example, the self-driving vehicle 1420 may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an application of the MR technology is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
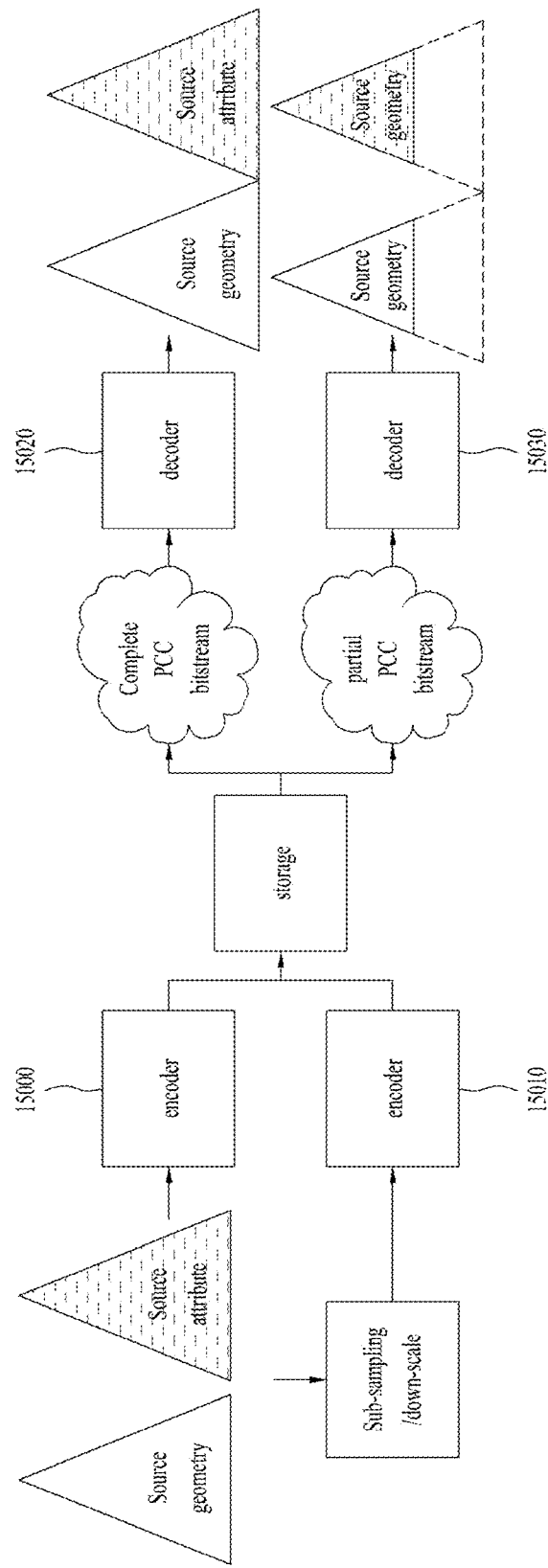
FIG. 15 is a flowchart illustrating a point cloud data encoder and a point cloud data decoder according to embodiments.

FIG. 15 is a flowchart illustrating a point cloud data encoder and a point cloud data decoder according to embodiments.

In the present disclosure, the method/device according to embodiments may be interpreted as including both a transmission method/device and a reception method/device. The transmission method/device according to the embodiments may represent a point cloud data encoder or point cloud data encoding, and the reception method/device according to the embodiments may represent a point cloud data decoder or point cloud data decoding.

A point cloud source according to embodiments is represented as a bitstream and is a set of points in decoding order. A point cloud may be composed of one or more sample arrays, and may include geometry information (geometry data), which is coordinate information, attribute information such as luma, reflectance, and color values, and an array representing attribute samplings for frame index, transparency, and the like.

A frame of point cloud data may be divided into tiles and slices.

The encoded and transmitted point cloud data may include a sequence parameter set, a tile inventory, a geometry parameter set, an attribute parameter set, geometry data, and attribute data.

The geometry data may consist of a header and data (payload). The header may include a geometry parameter set ID/tile, slice or frame ID. The payload may include node information for each geometry octree depth.

The attribute data may consist of a header and data (payload). The header may include a parameter set ID, an attribute ID, and an attribute geometry slice ID. The payload may include information about a prediction index, a residual value, attribute coding, and the like for each number of points.

Encoders 15000 and 15010 and decoders 15020 and 1530 of FIG. 15 may correspond to the encoder 1002 and decoder 1006 of FIG. 1, the encoder/encoding 20001 and decoder/decoding 20003 of FIG. 2, the PCC encoder of FIG. 4, the PCC decoder of FIG. 11, the geometry encoder and attribute encoder of FIG. 12, the geometry decoder and attribute decoder of FIG. 13, or the XR device 1430 of FIG. 14, respectively.

Embodiments propose a method for efficiently supporting selective decoding when selective decoding of a part of data is needed due to receiver performance or transmission speed in transmitting and receiving point cloud data. The proposed method includes a method to select information needed in a bitstream unit or remove unnecessary information by dividing geometry data and attribute data, which are conventionally delivered in data units, into semantic units such as geometry octree and LoD (Level of Detail). Here, a network abstraction layer (NAL) unit is defined as a unit for selecting information and a high level syntax (HLS) is defined for PCC structure reconstruction.

Thus, the embodiments address techniques for constructing a data structure composed of a point cloud. Specifically, a packing and signaling method for effectively delivering PCC data configured based on layers will be described, and a method applied to a scalable PCC-based service based on the method is proposed.

Point cloud data includes the position (geometry (e.g., XYZ coordinates)) and attributes (e.g., color, reflectance, intensity, grayscale, opacity, etc.). In point cloud compression (PCC), octree-based compression is performed to efficiently compress distribution characteristics of uneven distribution in a three-dimensional space, and attribute information is compressed based thereon. The G-PCC encoder and decoder have been described with reference to FIGS. 4 and 11, respectively. In this way, the operations of the embodiments may be processed by the respective components at the transmitting and receiving sides of the PCC.

The transmission device according to the embodiment compresses and transmits the point cloud data by dividing the position information (geometry data) about data points and attribute information (attribute data) such as color/brightness/reflectance into geometry and attributes. In this case, according to embodiments, PC data may be configured according to an octree structure having layers or Levels of Detail (LoDs), and scalable point cloud data coding and representation may be performed based thereon. In this operation, only a part of the point cloud data may be decoded or represented due to the performance of the receiver or the transfer rate. However, there is currently no method to remove unnecessary data in advance. That is, when only a part of a scalable PCC bitstream needs to be transmitted (e.g., when only some layers are decoded in scalable decoding), it may not be allowed to select and send only the necessary part. Accordingly, 1) only necessary parts should be re-encoded after decoding, or 2) after all data is transmitted, a necessary operation should be selectively applied by the receiver. However, in case 1), delay may occur due to the time for decoding and re-encoding. In case 2), bandwidth efficiency may be degraded due to transmission of unnecessary data. Further, when a fixed bandwidth is used, data quality may need to be lowered for transmission.

Changes and combinations of the embodiments of the present disclosure are possible. Terms used in the present disclosure may be understood based on the intended meaning of the terms within the scope of common use in the relevant field.

Proposed herein is a bitstream packing method for efficiently performing scalable representation, sub-sampling, subset extraction, and the like in a bitstream unit on a basis that point cloud data is configured in layers.

The encoder 15000 and the encoder 15010 are encoders of the point cloud data transmission device according to the embodiments. The decoder 15020 and the decoder 15030 are decoders of the point cloud data reception device according to the embodiments.

The encoder 15000 may encode geometry data and attribute data. Data input to the encoder may be referred to as source data. For example, the source geometry is geometry input data, and the source attribute is attribute input data. The encoder 15000 may encode the entirety of the source geometry data and the source attribute data to generate a complete PCC bitstream. The decoder 15020 may receive a complete PCC bitstream. The decoder 15020 may decode (or reconstruct) the complete source geometry data and source attribute data by decoding the data encoded and transmitted at the transmitting side.

Compared to the encoder 15000, the encoder 15010 may not fully encode the source data, but may encode only a part of the data based on a sub-sampling technique and/or a down-scale technique. Thus, the decoder 15030 may receive a partial PCC bitstream. The decoder 15030 may decode the partial PCC bitstream in a reverse process of the operation of the encoder 15010 to reconstruct partial geometry data and partial attribute data.

In the present disclosure, it is proposed that the transmission/reception method/device according to the embodiments configure PC data according to an octree structure or LoD (Level of Detail) that has layers corresponding to the degrees of detail, define a PCC NAL unit, signal a geometry/attribute layer structure through a parameter set, pre-remove unnecessary data, and transmit only a partial data (partial PCC bitstream).

Figure 16:
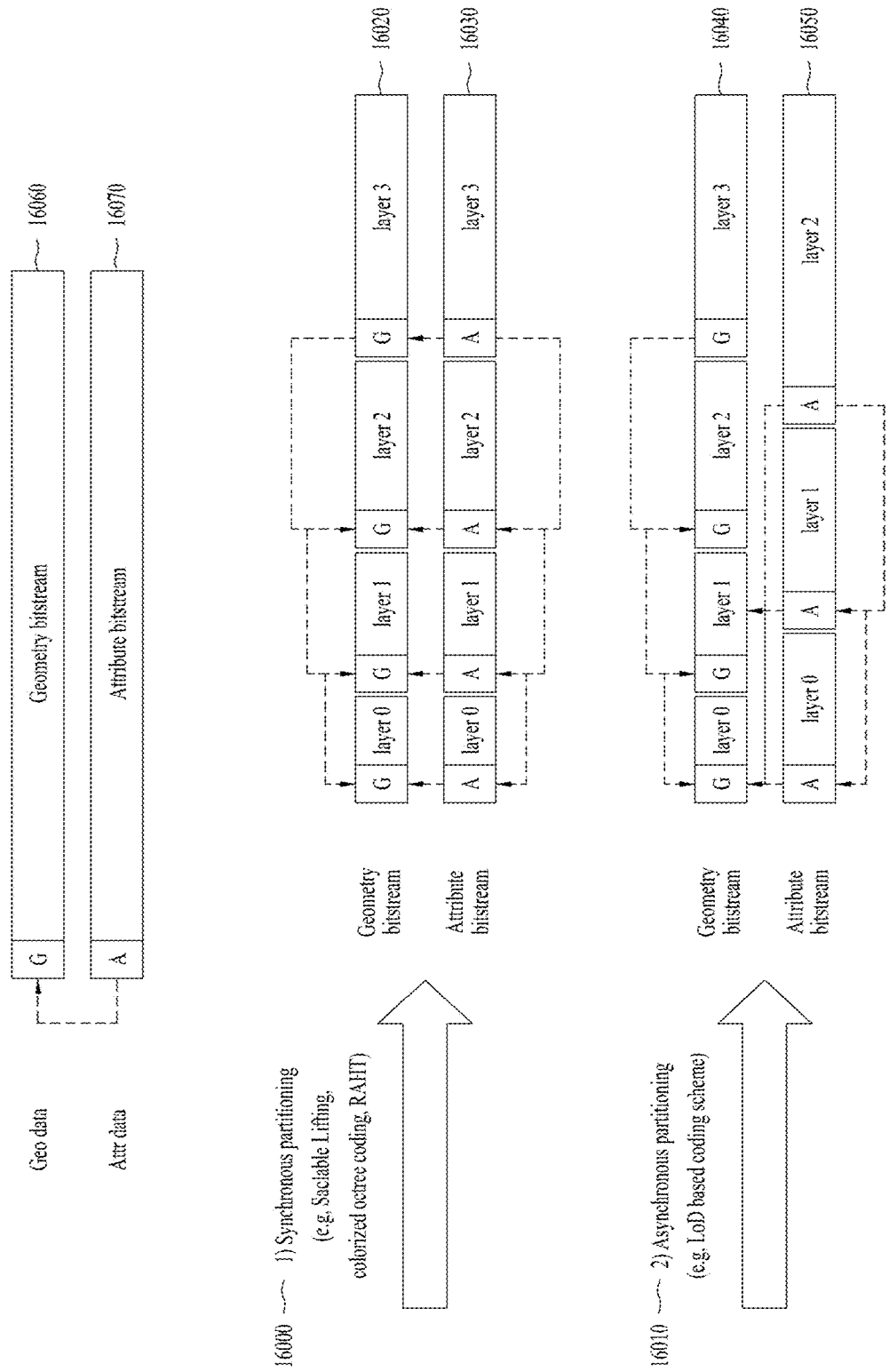
FIG. 16 shows the configuration of segments 16020 to 16050 of a bitstream according to embodiments.

FIG. 16 shows the configuration of segments 16020 to 16050 of a bitstream according to embodiments.

FIG. 16 illustrates a case where a transmission device according to embodiments divides a bitstream obtained through point cloud compression into a geometry data bitstream 16060 and an attribute data bitstream 16070 according to the types of data which are to be transmitted. Here, each bitstream may be configured and delivered on a slice-by-slice basis. Each of the geometry data bitstream 16060 and the attribute data bitstream 16070 may be configured in one unit and delivered regardless of the layer information or LoD information.

The geometry bitstreams 16060, 16020, and 16040 and the attribute bitstreams 16070, 16030, and 16050 of FIG. 16 may be generated/encoded by the encoders 15000 and 15010 of FIG. 15, and decoded/parsed by the decoders 15020 and 15030 of FIG. 15.

A slice refers to a series of syntax elements representing the entirety or a part of a coded point cloud frame.

In this case, the information for reconstructing geometry and attributes is all present in one slice. Accordingly, the possibility of reconstruction errors caused by information loss may be low, and the bitstream may be easily configured. However, to use only some information in the bitstream, the entire bitstream is required to be decoded. Further, when a subset of point cloud data is delivered or used in a scalable coding-based application field, information needs to be reconstructed. Accordingly, in order to address such issues, the method/device according to the embodiments may carry out scalable coding schemes 16000 and 16010 for the point cloud data.

For efficient selection of information at a bitstream level, the transmission/reception device according to the embodiments may segment the geometry bitstream and the attribute bitstream, respectively. In this case, data may be partitioned based on PCC layering.

A layer refers to a division unit of a bitstream for scalable decoding. A bitstream may be divided into segment(s). A segment corresponds to a layer. The layer may be included in a NAL unit. A NAL unit may include one or more layers. There may be various criteria for dividing a bitstream into layers according to embodiments, and data related to each other in the bitstream may belong to the same layer. In addition, the bitstream may be divided in units of layers based on units such as slices/tiles into which point cloud data may be partitioned.

For example, the encoder may compress geometry data based on an octree structure. In this case, pieces of information belonging to the same octree depth level may be bundled and delivered as one unit. Thus, the device of an application field requiring only a portion of information may selectively reconstruct necessary information in a bitstream unit.

When the encoder performs RAHT coding on an attribute, attribute data may be distinguished based on the octree depth level as in the case of geometry.

When the encoder performs predicting-lifting (Pred-Lifting) coding on the attribute, attribute data may be divided based on layers according to LoDs.

In partitioning the geometry bitstream into bitstream units based on the octree depth level, when the attribute is encoded based on RAHT, bitstream segments may be generated in the same units as the geometry (see Synchronous partitioning 16000 in FIG. 15).

As in 1) the synchronous partitioning 16000 of FIG. 16, signaling may be performed such that there is a similarity in structure between the geometry bitstream and the attribute bitstream.

As in 2) the asynchronous partitioning 16010 of FIG. 16, when the attribute is encoded by pred-lifting, the LoD may be configured independently from the geometry octree structure, and attribute bitstream segments may be configured in a format different from the geometry.

In this case, the bitstream segments 16020 to 16050 may be distinguished based on layers or using another method depending on application fields. When the distinction method as above affects decoding, information thereon may be separately signaled. In addition, information of only one layer or information of multiple or some layers may be matched per bitstream segment.

When the encoder of the transmission device according to the embodiments generates the geometry bitstream 16060 and the attribute bitstream 16070, the two bitstreams are required for encoding/decoding (reconstruction) because the attribute is dependent on the geometry. The structure of the geometry bitstream 16060 and the attribute bitstream 16070 may facilitate reconstruction of data included in one unit.

Further, the encoder of the transmission device according to the embodiments may generate the geometry bitstreams 16020 and 16040 and the attribute bitstreams 16030 and 16050. The geometry bitstream 16020 and the attribute bitstream 16030 may be generated based on bitstream segments. Each bitstream may be partitioned into one or more segments for each layer, and each segment of the geometry and each segment of the attribute may or may not be synchronized with each other according to a coding scheme for the attribute. As described above, information matching between bitstream segments and layers may be singular/plural matching. Hereinafter, a bitstream segment processing method according to embodiments will be further described.

Geometry data includes a layer generated based on the octree structure, and attribute data includes a layer generated based on the LOD.

In addition, performing synchronous partitioning is performed means that the number of points of the geometry is the same as that of the attribute in selective scalable decoding up to a specific layer.

When the geometry bitstream and the attribute bitstream are divided into layers as shown in FIG. 16 scalable decoding may be performed efficiently and quickly without the need for the receiver to determine whether the point cloud data received needs to be decoded up to a slice level.

As such, a layer according to the embodiments may be a partition unit of a bitstream for scalable decoding.

Further, a layer (segment) according to the embodiments of the present disclosure is not limited to scalable decoding, and may be a unit that may be partitioned/classified according to various characteristics of the geometry/attribute.

For example, a depth of the geometry used in geometry coding may have a layer even when scalable decoding is not performed. In addition, a direct coded point generated through IDCM and a bitstream compressed based on an octree may be divided into respective layers. Similarly, an attribute layer used in attribute coding may be present in attribute data other than in the case of scalable decoding. The attribute data may be divided into layers based on similarity between attributes.

Figure 17:
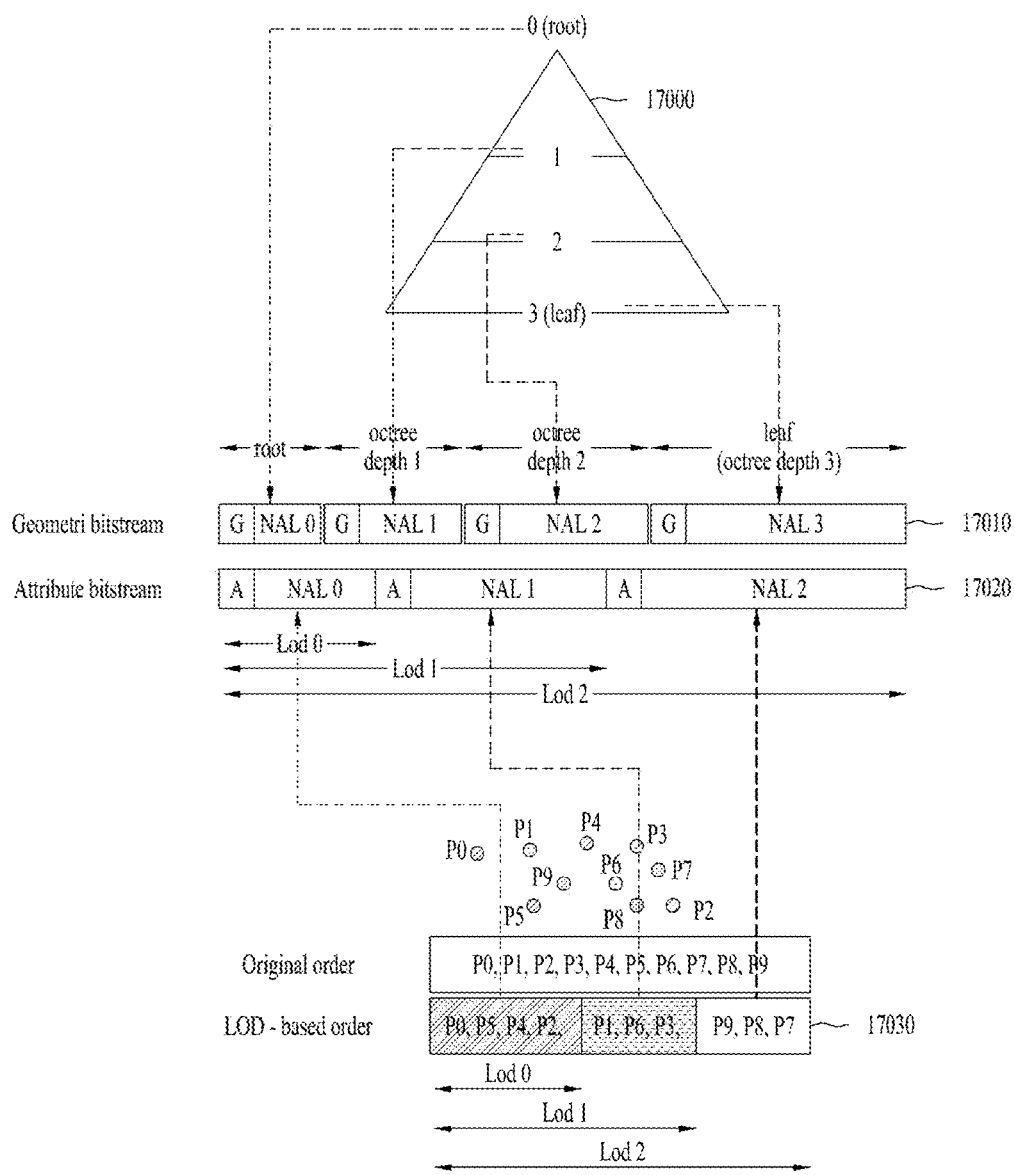
FIG. 17 illustrates bitstream segment matching based on a PCC layer structure according to embodiments.

FIG. 17 illustrates bitstream segment matching based on a PCC layer structure according to embodiments.

Hereinafter, a bitstream segment matching method based on a PCC layer structure will be described from the perspective of a point cloud data encoder according to embodiments.

FIG. 17 explains how to match the geometry/attribute data described in FIG. 16 to a geometry/attribute bitstream segment. The encoder of FIG. 15 may generate/match/encode a bitstream segment through the process of FIG. 17 and transmit the same.

FIG. 17 illustrates the correlation between the proposed bitstream segment configuration method and the layer structure of actual geometry data and attribute data. First, assuming that the geometry is composed of three octree depth levels 17000, the root to the leaf may be numbered from 0 to 3, and geometry bitstream segments 17010 matching the respective octree layers may also be numbered in the same manner.

For example, segmentation/numbering may be performed such that segment 0 (NAL0) is matched with a depth level 0 (root) node, segment 1 (NAL1) is matched with a depth level 1 node, segment 2 (NAL2) is matched with a depth level 2 node, and segment 3 (NAL3) is matched with a depth level 3 (leaf) node.

In this case, each bitstream segment may be packed and delivered in a unit called Network Abstract Layer (NAL). In addition, by defining information about the bitstream included in the NAL header (data type: geometry data; layer number=octree depth layer), whether to take information in the NAL unit may be determined even the bitstream is not parsed down to a lower level.

When the attribute is encoded by LoD-based pred-lifting (17030), information newly included for each LoD may be assumed to information constituting each layer as shown in FIG. 17.

The attribute bitstream segment 17020 may be packed in an attribute NAL unit. For example, attribute NAL unit 0 may be information constituting LoD0, attribute NAL units 0 and 1 may be information constituting LoD1, attribute NAL units 0, 1 and 2 may be information constituting LoD1 may be information constituting LoD2.

In this case, asynchronous partitioning may be applied because the bitstream segment configuration method differs between the geometry and the attribute.

When the same bitstream segment configuration method is used for the geometry and the attribute, the synchronous partitioning of FIG. 16 may be applied.

According to embodiments, the matching between the segments (units) of the geometry bitstream and the depth layers of the geometry octree structure may be one-to-one matching (packing) or many-to-many matching (packing).

According to embodiments, the matching between the segments (units) of the attribute bitstream and the layers of the attribute LOD structure may be one-to-one matching (packing) or many-to-many matching (packing).

According to embodiments, the depth and LOD may be a reference for distinguishing layers, or other references may be units of layers.

Figure 18:
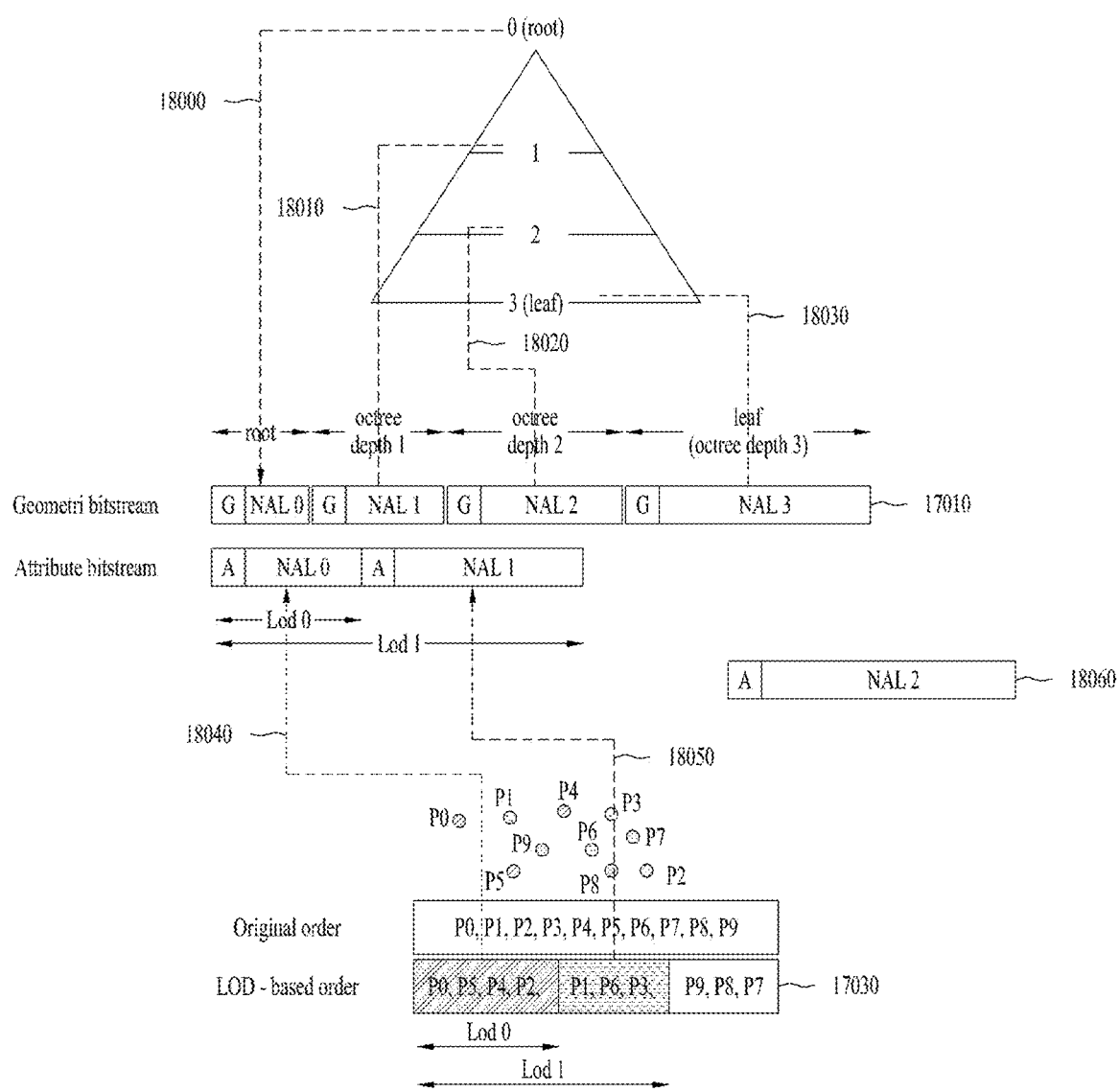
FIG. 18 illustrates decoding of a bitstream segment and layer matching of a PCC structure according to embodiments.

FIG. 18 illustrates decoding of a bitstream segment and layer matching of a PCC structure according to embodiments.

A process of decoding the bitstream segment structure generated as shown in FIG. 17 will be described from the perspective of a reception device (decoder) according to embodiments, with reference to FIG. 18.

As a corresponding process of the above-described embodiments, the point cloud reception device or decoder according to the embodiments may decode a bitstream segment, and then may match the bitstream segment to a layer in the PCC structure.

FIG. 18 illustrates how the decoder of FIG. 15 receives and decodes the geometry/attribute bitstream segment of FIG. 16. That is, FIG. 18 illustrates how the decoder matches the received geometry/attribute bitstream segments to geometry/attribute data.

The receiver may selectively decode/parse the bitstream segment partitioned and transmitted by the PCC layer structure based on the information in the NAL unit header.

Thereby, the amount of data transmitted to the decoder of the reception device may be efficiently/effectively reduced in advance. The decoder according to the embodiments may select a layer to be decoded for each of the geometry bitstream and the attribute bitstream.

For example, a layer selection method may be defined by the receiver system, or the transmitter may deliver information related to selection to the receiver based on the performance of the decoder.

The decoder may remove information after the layer based on the information in the NAL unit header. In FIG. 17, it is assumed that all four layers (octree depth levels 0 to 3) defined to be used for the geometry octree level, but layers up to LoD1 are defined to be used for the attribute. In this case, attribute NAL2 may not be selected/used based on the information of spatial_id (refer to FIG. 20) in the attribute NAL unit header. The selected information may be matched to a geometry octree layer and a LoD layer.

In this case, the entire layer configuration information and information matching a bitstream segment may be used as reference information for selecting the bitstream segment. The information may be transmitted through a parameter set such as SPS, GPS, or APS, or may be transmitted through information such as an SEI message (signaling information).

The point cloud reception device or decoder according to the embodiments may receive a bitstream and perform bitstream extraction/selection based on a NAL unit.

1) When nal_unit_type is equal to 0 (SPS_NUT), the receiving device or decoder parses the NAL unit, and determines whether the point cloud data or bitstream is divided based on slices (e.g., for data (bitstream) segmented into slices, sps_slice_segmentation flag) may be 1. Then, the reception device, the decoder, or the geometry decoder may perform the geometry bitstream selection/extraction process as follows.

2) For a slice-based segmented bitstream, when nal_unit_type is equal to 2 (GPS_NUT), the reception device, the decoder, or the geometry decoder parses the NAL unit.

The reception device, the decoder, or the geometry decoder may acquire geometry layer information that matches the nal_spatial_id in the NAL unit header. For example, according to embodiment, when gps_max_spatial_id is 3, gps_max_geom_layer_idx is 3, and nal_spatial_id is 0, gps_geom_layer_idx may be 0 (18000). When nal_spatial_id is 1, gps_geom_layer_idx may be 1 (18010). When nal_spatial_id is 2, gps_geom_layer_idx may be 2 (18020). When nal_spatial_id is 3, gps_geom_layer_idx may be 3 (18030). That is, a geometry layer may be selected based on the nal_spatial_id of the geometry bitstream segment.

The nal_spatial_id may be acquired based on information signaled in the NAL unit header of FIG. 20.

When there is a geometry layer targeted by the reception device, a geometry NAL unit having a value greater than nal_spatial_id matching the layer may be discarded. Accordingly, selective parsing of the NAL unit may be performed.

3) For the selected/extracted bitstream segment, the reception device, the decoder, or the geometry decoder may obtain a geometry slice segment by parsing the NAL unit. The decoder obtains the slice layer raw byte sequence payload (slice_layer_rbsp( )) by parsing all selected slices according to the transmission order (or according to the order signaled separately). In this case, since the PCC transmission/reception performs prediction based on the similarity between layers, the order of data reconstruction is very important.

4) The decoded geometry data may be reconstructed based on the layer structure identified in operation 2).

The reception device, the decoder, or the attribute decoder may perform attribute bitstream selection/extraction as follows.

5) When sps_synchronous_geom_attr_segment_flag included in the SPS is 0 (or 1, wherein the numeric value may be changed according to embodiments) (that is, this flag indicates a synchronous case), it may indicate that the attribute NAL unit is configured in the same way as the geometry NAL unit (16000) (e.g., sps_synchronous_geom_attr_segment_flag is 1). In this case, the attribute target layer may be set to the value of the geometry target layer, and a bitstream of a specific layer and lower layers may be extracted and selected through nal_spatial_id of the attribute NAL unit.

6) When sps_synchronous_geom_attr_segment_flag is equal to 1 (or 0, wherein the numeric value may be changed according to embodiments) (i.e., when this flag indicates the asynchronous case), the attribute NAL unit may be configured differently from the geometry NAL unit (16010). In this case, information corresponding to the case where nal_unit_type is 3 (APS_NUT) is parsed. Here, attribute layer information matching nal_spatial_id in the attribute NAL unit header may be acquired.

For example, according to an embodiment, when sps_synchromous_geom_attr_segment_flag=0 (i.e., the asynchronous case), suppose that aps_max_spatial_id is 3, and aps_max_attr_layer_idx is 2. In this case, when nal_spatial_id is 0, aps_attr_layer_idx may be 0 (18040). When nal_spatial_id is 1, aps_attr_layer_idx may be 1 (18050). When nal_spatial_id is 2, aps_attr_layer_idx may be 2. The structure of attribute layers may be identified based on nal_spatial_id and aps_attr_layer_idx as described above. Where there is a target geometry layer, an attribute NAL unit having a value greater than nal_spatial_id matching the corresponding layer may be discarded. In the embodiments, layer 2 may not be used. In this case, only information corresponding to LoD1 may be decoded by discarding the case of nal_spatial_id=2 (18060).

7) For the selected/extracted bitstream segment, the decoder may obtain an attribute slice segment by parsing the NAL unit. The decoder obtains slice_layer_rbsp( ) by parsing all selected slices according to the transmission order (or according to the order signaled separately). In this case, since the PCC performs prediction based on the similarity between layers, the order of data reconstruction is very important. In addition, when necessary, reconstructed geometry data may be used in attribute decoding.

8) The decoded data may be reconstructed based on the layer structure identified in operation 6).

In brief, in order to support the scalable/partial encoding/decoding of FIG. 15, embodiments may configure a geometry/attribute bitstream into segments. In this case, a NAL unit may be used. In addition, when the geometry/attribute bitstream is represented as segments as shown in FIG. 16, both a case where the geometry is synchronized with the attribute and/or a case where the geometry is no synchronized with the attribute may be considered. As shown in FIG. 17, the point cloud data transmission device according to the embodiments and/or the encoder of the transmission device may generate a geometry bitstream segment by matching the geometry bitstream segment to a level (depth/layer) of an octree node, and generate an attribute bitstream segment by matching the attribute bitstream segment to a LOD (layer) of attribute data. Similarly, as shown in FIG. 18, based on signaling information, the reception device according to the embodiments and/or the decoder of the point cloud data reception device may perform scalable (partial) decoding on the geometry bitstream according to the matched/signaled segment/NAL segment/octree level (depth/layer), and perform scalable (partial) decoding on the attribute bitstream segment according to the matched/signaled segment/NAL segment/LOD level.

The decoding according to the embodiments may include matching a unit of the geometry bitstream to an octree layer of the geometry data, and mapping a unit of the attribute bitstream to an LOD of the attribute data.

FIG. 19 shows a PCC NAL (network abstract layer) unit according to embodiments.

As used herein, the terms syntax and semantics may be understood only based on the intended meaning of the terms, and may be referred to by other terms within an equivalent range.

The NAL unit may be generated by the encoders 15000 and 15010 of FIG. 15, or the like.

The point cloud data transmission device and/or encoder according to the embodiments may define information about slices into which a bitstream is segmented in a sequence parameter set, a geometry slice header and an attribute slice header.

In addition, by defining the above-described segmentation-related information in a corresponding or separate position according to an application or a system, an application range, an application method, and the like may be used differently.

Further, the method of defining the information independently of an attribute coding technique according to embodiments may be defined in connection with the attribute coding technique.

The above-described segmentation-related information may be defined in the geometry parameter set for geometry scalability. In addition, when syntax elements shown in FIG. 19 are applicable not only to the current point cloud data stream but also to multiple point cloud data streams, the information may be delivered through a higher-level parameter set.

nal_unit specifies a NAL unit of a bitstream including point cloud data.

nal_unit_header is the header of a NAL unit. The NAL unit may consist of a header and a payload.

NumBytesInNalUnit specifies the number of bytes in the NAL unit.

rbsp_byte[i] indicates the I-th byte of an RBSP. RBSP represents a raw byte sequence payload. The payload of the NAL unit includes an RBSP. The RBSP may include a parameter set, such as an SPS, and a slice data RBSP.

emulation_prevention_three_byte has a value of 0x03. When the value is present, it must not be used in the decoding process.

The NAL unit is composed of a NAL unit header and a NAL unit payload, as shown in FIG. 19. The NAL unit payload may be configured in RBPS bytes.

Embodiments define a PCC network abstract layer (NAL) unit as a method for increasing the efficiency of bitstream unit selection when a bitstream is divided into segments. Here, the NAL unit may be divided into geometry NAL unit (nal_unit_type=16, 17) and attribute NAL unit (nal_unit_type=18, 19) according to nal_unit_type. In addition, non-coding layer information such as a parameter set or an SEI message may be distinguished.

The unit, which is a constituent unit of the bitstream, includes information about the structure of the unit of the bitstream.

FIG. 20 shows a header of a NAL unit according to embodiments.

When a PCC bitstream is configured in units of spatial layers, nuh_spatial_id_plus1 may be used to distinguish a spatial layer in bitstream units through a value obtained by subtracting 1 from the nuh_spatial_id_plus1. When a slice is divided in consideration of a spatial layer, the values of gsh_slice_id and ash_slice_id may be defined to be linked with nuh_spatial_id_plus1.

Matching between the PCC bitstream segment and the PCC layer described FIGS. 17 and 18 may be performed based on ID information corresponding to ID information of the raw unit header of FIG. 20.

A spatial layer may be a division unit of a PCC bitstream. A bitstream may be divided on a layer-by-layer basis based on the spatial ID information in the NAL unit header of the bitstream.

When slices are related to spatial layers, the slice ID of each geometry and attribute may be linked with the spatial ID of the NAL unit, such that the slice ID value may be matched to the spatial ID value. That is, the geometry may be divided into layers based on the octree structure, and the attributes may be divided into layers based on the LOD.

nal_unit_type specifies a NAL unit type. The details of the type values will be described with reference to FIG. 21.

nuh_layer_id_plus1 minus 1 may indicate a layer represented by the information of the CL (coding layer) NAL unit or the non-CL NAL unit.

FIG. 21 shows types of NAL unit according to embodiments.

Various types of NAL units may be signaled according to the value of nal_unit_type as follows. A transmission method/device (point cloud data transmission method/device) according to embodiments may generate and transmit a NAL unit, and a reception method according to embodiments may receive and parse information according to the type of the NAL unit. Thereby, the technical objects and effects described with reference to FIGS. 15 to 18 may be obtained.

The NAL unit of FIG. 19 is composed of a header and a payload, FIG. 20 describes the syntax of the header, and FIG. 21 shows the configuration of the payload according to the type of a unit signaled by the header of FIG. 20.

When nal_unit_type is 0, the NAL unit is SPS_NUT, the content of the NAL unit and RBSP syntax structure is Sequence parameter set (seq_parameter_set_rbsp( )), and the NAL unit type class is non-CL (coding layer).

When nal_unit_type is 1, the NAL unit is TPS_NUT, the content of the NAL unit and RBSP syntax structure is Tile parameter Set (tile_parameter_set_rbspo), and the NAL unit type class is non-CL.

When nal_unit_type is 2, the NAL unit is GPS_NUT, the content of the NAL unit and RBSP syntax structure is Geometry parameter set (geom_parameter_set_rbspo), and the NAL unit type class is non-CL.

When nal_unit_type is 3, the NAL unit is APS_NUT, the content of the NAL unit and RBSP syntax structure is Attribute parameter set (attribute_parameter_set_rbspo), and the NAL unit type class is non-CL.

When nal_unit_type is 4, the NAL unit is AUD_NUT, the content and RBSP syntax structure of the NAL unit is Access unit delimiter (access_unit_delimiter_rbsp( )), and the NAL unit type class is non-CL.

When nal_unit_type is 5, the NAL unit is PREFIX_SEI_NUT, the content of the NAL unit and RBSP syntax structure is Supplemental enhancement information (sei_rbsp( )), and the NAL unit type class is non-CL.

When nal_unit_type is 6, the NAL unit is SUFFIX_SEI_NUT, the content and RBSP syntax structure of the NAL unit is Supplemental enhancement information (sei_rbsp( )), and the NAL unit type class is non-CL.

When nal_unit_type is 7, the NAL unit is EOS_NUT, the content of the NAL unit and RBSP syntax structure is End of sequence (end_of_seq_rbsp( )), and the NAL unit type class is non-CL.

When nal_unit_type is 8, the NAL unit is EOB_NUT, the content of the NAL unit and RBSP syntax structure is End of sequence (end_of_bitstream_rbsp( )), and the NAL unit type class is non-CL.

When nal_unit_type is 9 to 15, the NAL unit is RSV_NCL9 to RSV_NCL15, the content of the NAL unit and RBSP syntax structure is Reserved, and the NAL unit type class is non-CL.

When nal_unit_type is 16, the NAL unit is IDG_NUT, the content of the NAL unit and RBSP syntax structure is Coded slice of an independent decodable geometry (slice_layer_rbsp( )), and the NAL unit type class is GCL (Geometry coding layer).

When nal_unit_type is 17, the NAL unit is DG_NUT, the content of the NAL unit and RBSP syntax structure is Coded slice of a dependent geomery (slice_layer_rbsp( )), and the NAL unit type class is GCL.

When nal_unit_type is 18, the NAL unit is IDA_NUT, the content of the NAL unit and RBSP syntax structure is Coded slice of an independent decodable attribute (slice_layer_rbsp( )), and the NAL unit type class is ACL (Attribute coding layer).

When nal_unit_type is 19, the NAL unit is DA NUT, the content of the NAL unit and RBSP syntax structure is Coded slice of a dependent attribute (slice_layer_rbsp( )), and the NAL unit type class is ACL.

When nal_unit_type is 20 to 27, the NAL units are RSV_NVCL20 to RSV_NVCL27, the content of the NAL unit and RBSP syntax structure is Reserved, and the NAL unit type class is CL (coding layer).

When nal_unit_type is 28 to 31, the NAL units are UNSPEC28 to UNSPEC31, the content of the NAL unit and RBSP syntax structure is Unspecified, and the NAL unit type class is CL.

FIG. 22 shows a sequence parameter set according to embodiments.

FIG. 22 shows a configuration of payload information of a NAL unit that may be included according to a type indicated by the header of the NAL unit.

sps_slice_segment_flag equal to 1 may indicate that the slice is divided. When the flag is 0, it may indicate that each of a geometry and an attribute is configured in one slice.

sps_synchronous_geom_attr_segment_flag equal to 1 may indicate that a geometry slice and an attribute slice are divided in the same structure. The flag equal to 0 may indicate that a geometry slice and an attribute slice are divided in independent structures. When sps_slice_segment_ flag is equal to 0, sps_synchronous_geom_attr_segment_flag should be 0.

profile_compatibility_flags[j] equal to 1 indicates that the bitstream conforms to the profile indicated by profile_idc equal to j. The value of profile_compatibility_flag[j] may be equal to 0 for any value of j that is not specified as a value of profile_idc.

level_idc indicates a level to which to which the bitstream belongs. Bitstreams shall not contain other values of level_idc. Other values of level_idc are reserved for future use by ISO/IEC.

sps_bounding_box_present_flag equal to 1 indicates a source bounding box offset, and the size information is signaled in the SPS. sps_bounding_box_present_flag equal to 0 indicates the source bounding box information is not signaled.

sps_bounding_box_offset_x indicates the x offset of the source bounding box in Cartesian coordinates. When not present, the value of sps_bounding_box_offset_x is inferred to be 0.

sps_bounding_box_offset_y indicates the y offset of the source bounding box in Cartesian coordinates. When not present, the value of sps_bounding_box_offset_y is inferred to be 0.

sps_bounding_box_offset_z indicates the z offset of the source bounding box in Cartesian coordinates. When not present, the value of sps_bounding_box_offset_z is inferred to be 0.

sps_bounding_box_scale_factor indicates the scale factor of the source bounding box in Cartesian coordinates. When not present, the value of sps_bounding_box_scale_factor is inferred to be 1.

sps_bounding_box_size_width indicates the width of the source bounding box in Cartesian coordinates. When not present, the value of sps_bounding_box_size_width is inferred to be 1.

sps_bounding_box_size_height indicates the height of the source bounding box in Cartesian coordinates. When not present, the value of sps_bounding_box_size_height is inferred to be 1.

sps_bounding_box_size_depth indicates the depth of the source bounding box in Cartesian coordinate. When not present, the value of sps_bounding_box_size_depth is inferred to be 1.

sps_source_scale_factor indicates the scale factor of the source point cloud.

sps_seq_parameter_set_id provides an identifier for the SPS for reference by other syntax elements. The value of sps_seq_parameter_set_id may be 0 in bitstreams conforming to a specific version of the embodiments. Other values may be reserved for future use by ISO/IEC.

sps_num_attribute_sets indicates the number of coded attributes in the bitstream. The value of sps_num_attribute_sets may be in the range of 0 to 63.

attribute_dimension[i] specifies the number of components of the i-th attribute.

attribute_instance_id[i]) specifies the instance ID for the i-th attribute.

attribute bitdepth[i] specifies the bitdepth of the i-th attribute signal(s).

attribute_cicp_colour_primaries[i] indicates the chromaticity coordinates of the colour attribute source primaries of the i-th attribute.

attribute_cicp_transfer_characteristics[i] either indicates the reference opto-electronic transfer characteristic function of the colour attribute as a function of a source input linear optical intensity Lc with a nominal real-valued range of 0 to 1 or indicates the inverse of the reference electro-optical transfer characteristic function as a function of an output linear optical intensity Lo with a nominal real-valued range of 0 to 1 attribute_cicp_matrix_coeffs[i] describes the matrix coefficients used in deriving luma and chroma signals from the green, blue, and red, or Y, Z, and X primaries.

attribute_cicp_video_full_range_flag[i] indicates the black level and range of the luma and chroma signals as derived from E'Y, E'PB, and E'PR or E'R, E'G, and E'B real-valued component signals.

known_attribute_label_flag[i] equal to 1 specifies know_attribute_label signaled for the i-th attribute. known_attribute_label_flag[i] equal to 0 specifies attribute_label_four bytes signaled for the i-th attribute.

known_attribute_label[i] equal to 0 specifies that the attribute is color. known_attribute_label[i] equal to 1 specifies that the attribute is reflectance. known_attribute_label[i] equal to 2 specifies that the attribute is frame index.

attribute_label_four bytes[i] indicates the known attribute type with the 4 bytes code.

attribute_label_four bytes[i] equal to 0 indicates that the attribute type is color. attribute_label_four bytes[i] equal to 1 indicates that the attribute type is reflectance. attribute_label_four bytes[i] equal to 0xffffffff indicates that the attribute type is unspecified.

sps_extension_present_flag equal to 1 specifies that the sps_extension_data syntax structure is present in the SPS syntax structure. sps_extension_present_flag equal to 0 specifies that this syntax structure is not present. When not present, the value of sps_extension_present_flag is inferred to be equal to 0.

sps_extension_data_flag may have any value. Its presence and value do not affect decoders conforming to a version according to the embodiments.

Due to the syntax and semantics described in the present disclosure, effects of the method/device according to the embodiments may be provided.

FIG. 23 shows geometry_parameter_set according to embodiments.

gps_max_spatial_id indicates the maximum value of the spatial ID for the current geometry. gps_max_spatial_id may have a value between 0 and the maximum value of nuh_spatial_id_plus1 given when the NAL unit type class is GCL (geometry coding layer). As described with reference to FIG. 18, this information is used when the decoder according to the embodiments performs the matching operation.

gps_max_geom_layer_idx indicates the maximum value of a geometry layer defined in geometry coding. For example, it may have a max octree depth level value for a geometry configured in an octree structure. As described with reference to FIG. 18, this information is used when the decoder according to the embodiments performs the matching operation.

OCTREE refers to an 8-ary tree representing the 3D geometry of a point cloud. An encoder encoding geometry data according to embodiments may use a geometry octree. The octree structure is generated by recursive subdividing.

gps_geom_layer_idx [i] indicates a geometry layer matching the i-th spatial_id. For example, for a geometry configured in an octree structure, an octree depth level matching spatial_id may be indicated.

gps_geom_layer_idx [i] as many as the value of gps_max_spatial_id is signaled in the geometry parameter set. As described with reference to FIG. 18, this information is used when the decoder according to the embodiments performs the matching operation.

gps_geom_parameter_set_id provides an identifier for the GPS for reference by other syntax elements. The value of gps_seq_parameter_set_id may be in the range of 0 to 15, inclusive.

gps_seq_parameter_set_id specifies the value of sps_seq_parameter_set_id for the active SPS. The value of gps_seq_parameter_set_id may be in the range of 0 to 15, inclusive.

gps_box_present_flag equal to 1 specifies that additional bounding box information is provided in a geometry header that references the current GPS. gps bounding box_present_flag equal to 0 specifies that additional bounding box information is not signaled in the geometry header.

gps_gsh_box_log 2_scale_present_flag equal to 1 specifies that gsh_box_log 2_scale is signaled in each geometry slice header that references the current GPS. gps_gsh_box_log 2_scale_present_flag equal to 0 specifies that gsh_box_log 2_scale is not signaled in each geometry slice header, and a common scale for all slices is signaled in gps_gsh_box_log 2_scale of the current GPS. When gps_box_present_flag is 1, gps_gsh_box_log 2_scale_present_flag is signaled.

gps_gsh_box_log 2_scale indicates the common scale factor of bounding box origin for all slices that reference the current GPS.

unique_geometry_points_flag equal to 1 indicates that all output points have unique positions. unique_geometry_points_flag equal to 0 indicates that two or more of the output points may have the same positions.

neighbour_context_restriction_flag equal to 0 indicates that octree occupancy coding uses contexts determined from six neighbouring parent nodes. neighbour_context_restriction_flag equal to 1 indicates that octree coding uses contexts determined from sibling nodes only inferred_direct_coding_mode_enabled_flag equal to 1 indicates that direct_mode_flag may be present in the geometry node syntax. The flag equal to 0 indicates that direct_mode_flag is not present in the geometry node syntax.

bitwise_occupancy_coding_flag equal to 1 indicates that geometry node occupancy is encoded using bitwise contextualisation of the syntax element occupancy_map. bitwise_occupancy_coding_flag equal to 0 indicates that geometry node occupancy is encoded using the dictionary encoded syntax element occypancy_byte.

adjacent_child_contextualization_enabled_flag equal to 1 indicates that the adjacent children of neighbouring octree nodes are used for bitwise occupancy contextualization. adjacent_child_contextualization_enabled_flag equal to 0 indicates that the children of neighbouring octree nodes are not used for the occupancy contextualization).

log 2_neighbour_avail_boundary specifies the value of the variable NeighbAvailBoundary. This value is used in the decoding process as follows.

NeighbAvailBoundary=2"log 2_neighbour_avail_boundary"

When neighbour_context_restriction_flag is equal to 1, NeighbAvailabilityMask is set equal to 1. On the other hand, when neighbour_context_restriction_flag is equal to 0, NeighbAvailabilityMask is set equal to 1<<log 2_neighbour_avail_boundary.

log 2_intra_pred_max_node_size specifies the octree node size eligible for occupancy intra prediction.

Trisoup node size (log 2_trisoup_node_size): Specifies the variable TrisoupNodeSize as the size of the triangle nodes as follows:

TrisoupNodeSize=1<<log 2_trisoup_node_size

When log 2_trisoup_node_size is equal to 0, the geometry bitstream includes only the octree coding syntax. When log 2_trisoup_node_size is greater than 0, it is a requirement of bitstream conformance that: inferred_direct_coding_mode_enabled_flag must be equal to 0, and unique_geometry_points_flag must be equal to 1.

gps_extensionpresent_flag equal to 1 specifies that the gps_extension_data syntax structure is present in the GPS syntax structure. gps_extension_present_flag equal to 0 specifies that this syntax structure is not present. When not present, the value of gps_extensionpresent_flag is inferred to be equal to 0 gps_extension_data_flag may have any value. Its presence and value do not affect decoder conformance to profiles according to embodiments. Decoders conform to a profile according to embodiments.

FIG. 24 shows an attribute parameter set (attribute_parameter_set( )) according to embodiments.

aps_max_spatial_id indicates the maximum value of spatial_id for the current attribute. aps_max_spatial_id may have a value between 0 and the maximum value of nuh_spatial_id_plus1 given when the NAL unit type class is ACL (Attribute coding layer). When the geometry/attribute is not synchronous according to sps_synchronous_geom_attr_segment_flag), aps_max_spatial_id, aps_max_attr_layer_idx, and aps_attr_layer_idx_[i] may be signaled. aps_attr_layer_idx_[i] may be signaled for each aps_max_spatial_id.

aps_max_attr_layer_idx indicates the maximum value of an attribute layer constituting an attribute. For example, it may have the maximum value of the LoD layer when attribute coding is performed based on LoD.

aps_attr_layer_idx [i] indicates an attribute layer matching the i-th spatial_id. For example, it may indicate a LoD layer matching spatial_id of the attribute layer when attribute coding is performed based on the LoD structure.

aps_attr_parameter_set_id provides an identifier for the APS for reference by other syntax elements. The value of aps_attr_parameter_set_id may be in the range of 0 to 15, inclusive.

aps_seq_parameter_set_id specifies the value of sps_seq_parameter_set_id for the active SPS. The value of aps_seq_parameter_set_id may be in the range of 0 to 15, inclusive.

attr_coding_type indicates the coding type for the attribute for the given value of attr_coding_type. The value of attr_coding_type may be equal to 0, 1, or 2. Other values of attr_coding_type are reserved for future use by ISO/IEC. Decoders may ignore the reserved values of attr_coding_type.

For example, when attr_coding_type is equal to 0, the coding type is Predicting Weight Lifting. When attr_coding_type is equal to 1, the coding type is Region Adaptive Hierarchical Transform (RAHT). When attr_coding_type is equal to 2, the coding type is Fix Weight Lifting.

aps_attr_initial_qp specifies the initial value of the variable SliceQp for each slice referring to the APS. The initial value of SliceQp is changed/modified at the attribute slice segment layer when non-zero values of slice_qp_delta_luma or slice_qp_delta_luma are decoded. The value of aps_attr_initial_qp may be in the range of 0 to 52, inclusive.

aps_attr_chroma_qp_offset specifies the offsets to the initial quantization parameter signaled by the syntax aps_attr_initial_qp.

aps_slice_qp_delta_present_flag equal to 1 specifies that the ash_attr_qp_delta_luma and ash_attr_qp_delta_luma syntax elements are present in the ASH. aps_slice_qp_present_flag equal to 0 specifies that the ash_attr_qp_delta_luma and ash_attr_qp_delta_luma syntax elements are not present in the ASH.

lifting_num_pred_nearest_neighbours specifies the maximum number of nearest neighbors to be used for prediction. The value of lifting_num_pred_nearest_neighbours may be in the range of 1 to xx.

lifting_max_num_direct_predictors specifies the maximum number of predictors to be used for direct prediction. The value of lifting_max_num_direct_predictors may be in the range of 0 to lifting_num_pred_nearest_neighbours.

The value of the variable MaxNumPredictors used in the decoding process is given as follows: MaxNumPredictors=lifting_max_num_direct_predictors+1 lifting_search_range specifies the search range used to determine nearest neighbors to be used for prediction and to build distance-based levels of detail.

lifting_lod_regular_sampling_enabled_flag equal to 1 specifies that levels of detail are built using a regular sampling strategy. lifting_lod_regular_sampling_enabled_flag equal to 0 specifies that a distance-based sampling strategy is used instead.

lifting_num_detail_levels_minus1 specifies the number of levels of detail for the attribute coding. The value of lifting_num_detail_levels_minus1 may be in the range of 0 to xx.

lifting_num_pred_nearest_neighbours, lifting_max_num_ direct_predictors, lifting_search_range, lifting_lod_regular_sampling_enabled_flag, and lifting_num_detail_levels_minus1 are signaled according to the value of isLifting. The isLifting value is 1 when attr_coding_type is equal to 0 or 2. Otherwise, it is 0.

lifting_sampling_period[idx] specifies the sampling period for the level of detail idx. The value of lifting_sampling_period[ ] may be in the range of 0 to xx.

lifting_sampling_period and lifting_sampling_distance_squared[idx] are signaled according to lifting_lod_decimation_enabled_flag, and may be signaled for each of indexes as many as the value of num_detail_levels_minus1.

lifting_sampling_distance_squared[idx] specifies the square of the sampling distance for the level of detail idx. The value of lifting_sampling_distance_squared[ ] may be in the range of 0 to xx.

lifting_adaptive_prediction_threshold specifies the threshold to enable adaptive prediction. The value of lifting_adaptive_prediction_threshold[ ] may be in the range of 0 to xx.

lifting_intra_lod_prediction_num_layers specifies number of LoD layers where decoded points in the same LoD layer could be referred to to generate prediction value of a target point. lifting_intra_lod_prediction_num_layers equal to num_detail_levels_minus1 plus 1 indicates that target point could refer to decoded points in the same LoD layer for all LoD layers. lifting_intra_lod_prediction_num_layers equal to 0 indicates that the target point could not refer to decoded points in the same LoD layer for any LoD layers. lifting_intra_lod_prediction_num_layers may be in the range of 0 to lifting_num_detail_levels_minus1 plus 1.

lifting_adaptive_prediction_threshold and lifting_intra_lod_prediction_num_layers are signaled when attr_coding_type is equal to 0.

aps_extensionpresent_flag equal to 1 specifies that the aps_extension_data syntax structure is present in the APS syntax structure. aps_extension_present_flag equal to 0 specifies that this syntax structure is not present. When not present, the value of aps_extensionpresent_flag is inferred to be equal to 0.

aps_extension_data_flag may have any value. Its presence and value do not affect decoders conforming to a profile according to embodiments.

Figure 25:
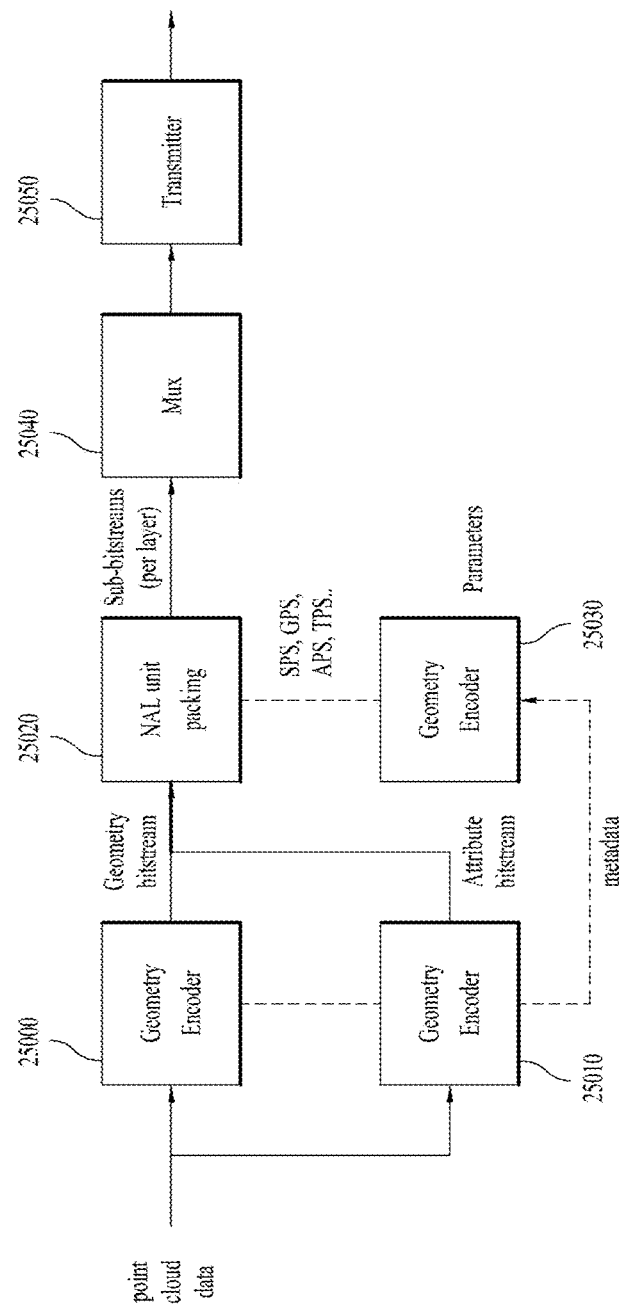
FIG. 25 illustrates an encoder of a point cloud data transmission device according to embodiments.

FIG. 25 illustrates an encoder of a point cloud data transmission device according to embodiments.

Hereinafter, components of a transmission terminal and a reception terminal according to embodiments will be described. Each component may correspond to a processor, software, or hardware. In addition, the components described below may be combined with the structure and/or signaling information of the PCC transmission terminal and reception terminal.

FIG. 25 illustrates an embodiment of a detailed functional configuration for encoding and transmitting PCC data according to embodiments. When the point cloud data is input to the encoders 25000 and 25010, the encoders 25000 and 25010 provide position information (geometry data (e.g., XYZ coordinates, phi-theta coordinates, etc.)) and attribute information (attribute data (e.g., color, reflectance, intensity, grayscale, opacity, medium, material, glossiness, etc.)), respectively. Compressed data is divided into units for transmission. The data may be divided and packed in NAL units by a packing module 25020 according to layering structure information.

In other words, the geometry encoder 25000 receives the point cloud data and encodes the geometry data of the point cloud data. The encoded geometry data may take the form of a geometry bitstream.

The attribute encoder 25010 receives the point cloud data and encodes the attribute data of the point cloud data. The encoded attribute data may take the form of an attribute bitstream.

The NAL unit packer 25020 receives the geometry/attribute bitstream and/or metadata, and partitions and/or packs the bitstreams described above with reference to FIGS. 15 to 17 and 19 to 24 into NAL units for a layer structure. The NAL unit packer 25020 may be present as a separate component or may be included in the geometry/attribute encoders 25000, 25010 to perform a corresponding operation.

A metadata generator 25030 generates metadata that is signaling information related to the operation of the geometry encoding 25000 and/or the attribute encoding 25010. For example, the SPS, GPS, APS, TPS, and the like described with reference to FIGS. 19 to 24 may be generated and provided to the NAL unit packer 25020.

A multiplexer 25040 may receive and multiplex sub-bitstreams per layer.

A transmitter 25050 may transmit a point cloud bitstream.

According to the above-described embodiments, the point cloud data transmission device may increase storage and transmission efficiency by partitioning/compressing PCC data and transmitting the same.

Figure 26:
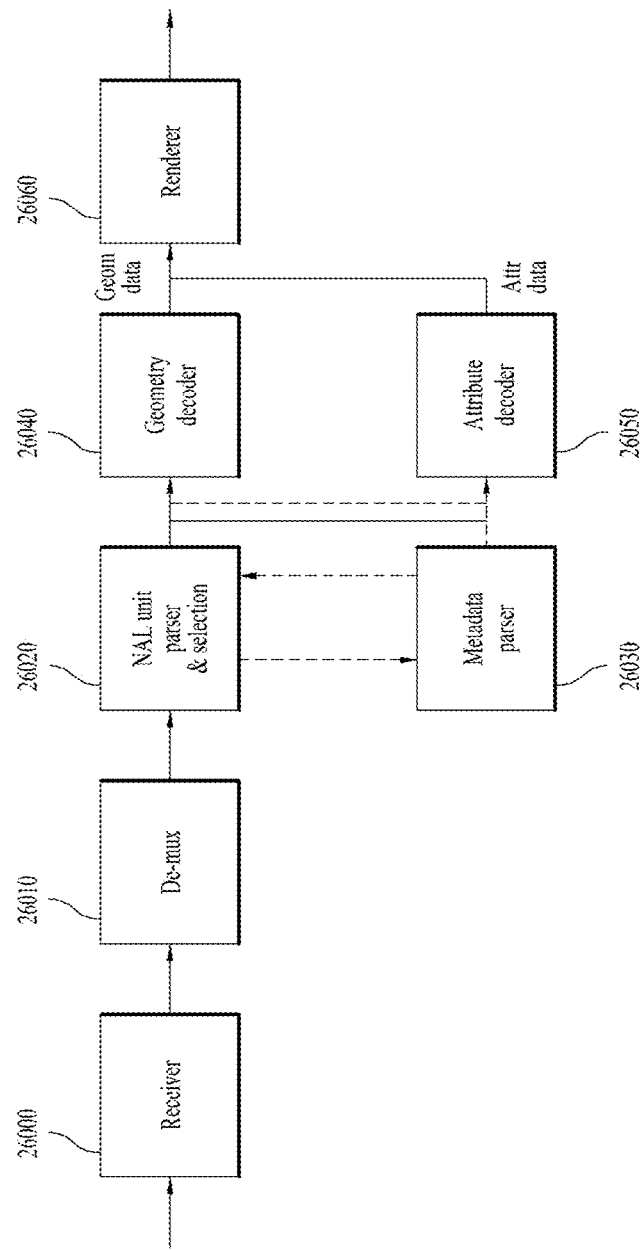
FIG. 26 illustrates a decoder of a point cloud data reception device according to embodiments.

FIG. 26 illustrates a decoder of a point cloud data reception device according to embodiments.

FIG. 26 illustrates an embodiment of a detailed functional configuration for receiving/decoding PCC data according to embodiments. When a bitstream is input to a receiver 26000, the receiver 26000 may divide the same into a bitstream for position information and a bitstream for attribute information and process but divided bitstreams. In this case, a NAL unit parser 26020 may distinguish between no-CL (non-coding layer) information such as SPS, GPS, and APS, and a CL (coding layer) such as a geometry NAL unit and an attribute NAL unit. A metadata parser 26030 may identify the geometry and attribute layer structure of the point cloud data based on the information carried in the SPS, GPS, and APS and set a target layer to be decoded. NAL unit selection 26020 may be performed to remove a layer excluded from decoding in a NAL unit based on nal_spatial_id. A geometry decoder 26040 and an attribute decoder 26050 may reconstruct geometry data and attribute data from the classified bitstreams according to the characteristics of the data, respectively, and then a renderer 26060 may convert the data into a format for final output.

In other words, the receiver 26000 may receive a point cloud bitstream transmitted by the transmission device according to the embodiments.

A demultiplexer 26010 may demultiplex the point cloud bitstream.

Upon receiving the demultiplexed point cloud bitstream, the NAL unit parser/selector 26020 may parse the metadata, geometry data, and/or attribute data described with reference to FIGS. 19 to 24 based on the NAL unit described with reference to FIGS. 16 to 20 and select data to be decoded.

The metadata parser 26030 may parse metadata in the point cloud data bitstream. It may provide the metadata to the NAL unit parser/selector 26020. Based on the parsed metadata, operations of the decoders 26040 and 26050 may be performed.

The geometry decoder 26040 decodes the geometry data.

The attribute decoder 26050 decodes the attribute data.

The renderer 26060 may render the geometry/attribute data.

Each process in FIG. 26 may process the complete and/or partial PCC bitstream as illustrated in FIG. 15 and may scalably and efficiently provide the same to the user. Accordingly, the decoder or receiver may divide and process data according to layers. Thereby, decoder performance may be increased.

Figure 27:
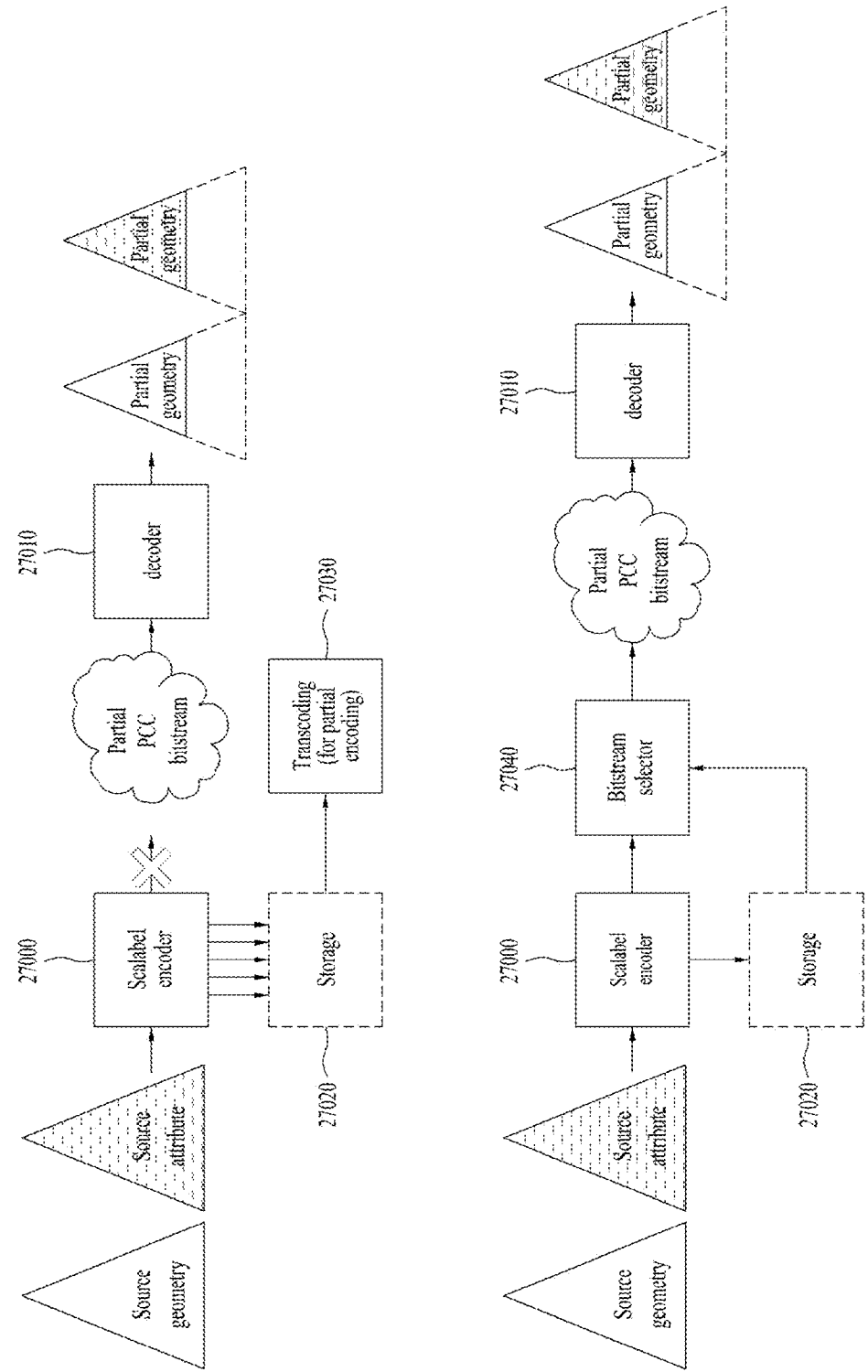
FIG. 27 illustrates a flow of transmission and reception of point cloud data according to embodiments.

FIG. 27 illustrates a flow of transmission and reception of point cloud data according to embodiments.

Figure 28:
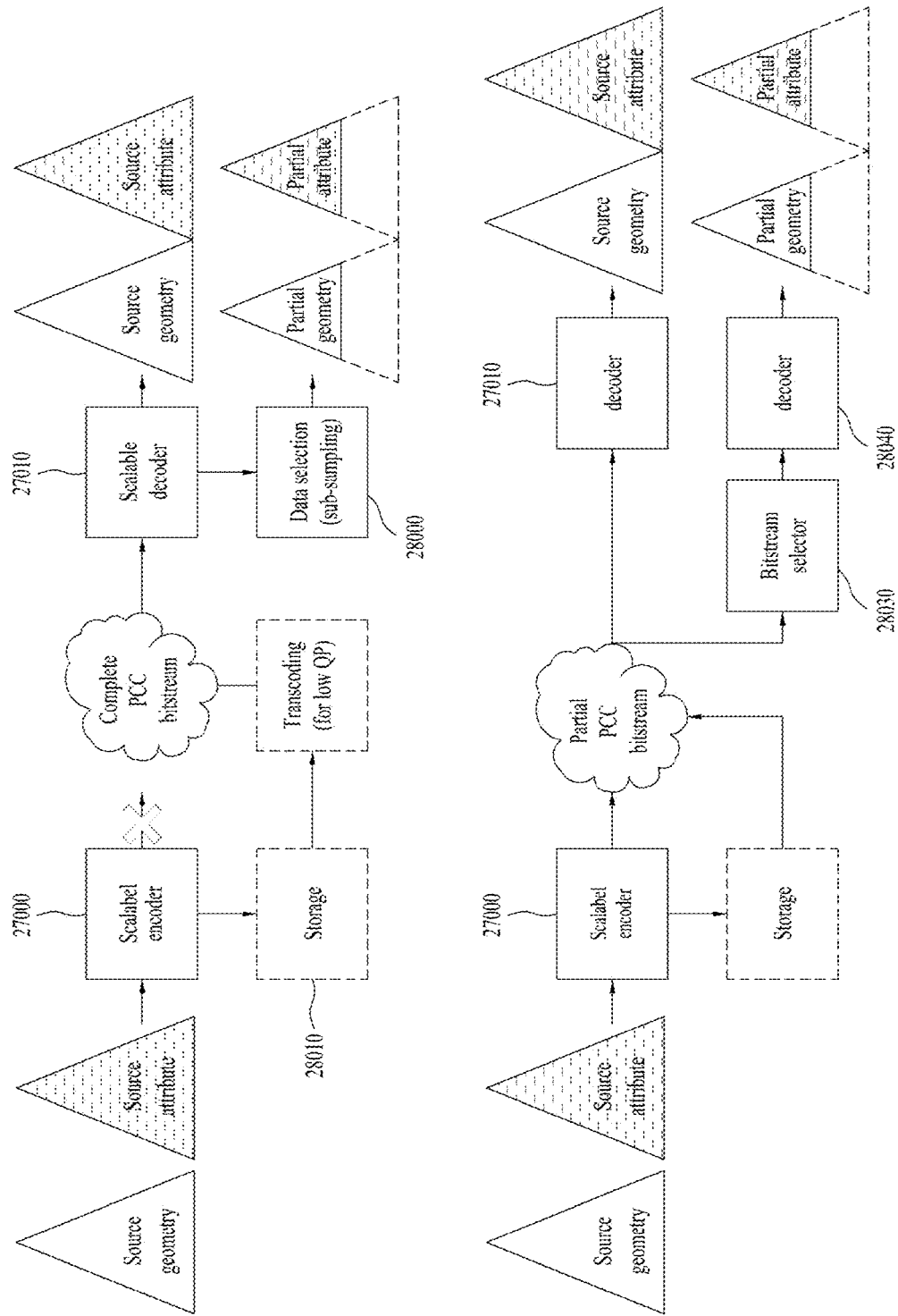
FIG. 28 illustrates a flow of transmission and reception of point cloud data according to embodiments.

FIG. 27 illustrates effects of the transmitting terminal according to the embodiments. FIGS. 27 and 28 illustrate various use cases according to embodiments.

The embodiments provide a method of transmitting point cloud data by dividing compressed data according to a predetermined criterion. In particular, when layered coding is used, the compressed data may be divided and transmitted according to layers, and storage and transmission efficiency of the transmitting terminal may be increased.

As illustrated in FIG. 27, the geometry and attributes of the point cloud data may be compressed and provided. In the PCC-based service, the compression rate or the number of data to be transmitted may be adjusted according to the receiver performance or transmission environment. In the case where the point cloud data is bundled in one slice unit, if the receiver performance or transmission environment changes, 1) a bitstream suitable for each environment may be pre-converted, stored separately, and selected when it is to be transmitted (27020, 27040), 2) or a process of transcoding 27030 is required prior to transmission. In this case, when the number of receiver environments to be supported increases or the transmission environment is frequently changed, an issue related to storage space or delay according to transcoding may occur.

As shown in FIG. 15, before data transmission, the point cloud data may be sub-sampled according to various decoder performances, and then encoded and stored.

In addition, when compressed data is divided and transmitted in NAL units according to layers as proposed in the embodiments, only a necessary part of the pre-compressed data may be selectively transmitted in the bitstream step through the information in the NAL unit header, without a separate transformation process (see FIGS. 19-20).

This scheme may be efficient even in terms of storage space because only one storage space per stream is required. In addition, since only necessary layers are selected before transmission, efficient transmission may be implemented in terms of bandwidth (by the bitstream selector 27040). The bitstream selector 27040 may be included in the transmission device or may be connected to the encoder, the transmitter, or the like. The scalable encoder 27000 and the bitstream selector 27040 may encode and selectively transmit a layer-based partial PCC bitstream (see FIGS. 16 to 18).

The encoder 27000 may correspond to the encoder according to the above-described embodiments. The geometry/attribute data input as a source may be scalably encoded, but not immediately transmitted. Instead, the encoded data may be stored in the storage space 27020. The storage space 27020 may be included in a point cloud data transmission device according to embodiments, and may be connected to the encoder 10002 or the transmitter 10003. The transmission device may selectively transmit the point cloud data stored in the storage space 27020. Also, the transmission device may perform transcoding 27030 for partial encoding on the point cloud data and then transmit the data.

The decoder 27010 may correspond to the decoder according to the above-described embodiments. It may partially reconstruct the geometry/attribute data from the received bitstream.

FIG. 28 illustrates a flow of transmission and reception of point cloud data according to embodiments.

FIG. 28 illustrates a process in which the transmission device and reception device according to the above-described embodiments transmit and receive point cloud data.

The transmission/reception device according to the embodiments may transmit the point cloud data by dividing compressed data according to a predetermined criterion. When layered coding according to the embodiments is employed, the point cloud data may be divided and transmitted in a compressed data form according to layers. In this case, the efficiency at the receiving side may be increased.

In particular, FIG. 28 illustrates the operations of the translation device and reception device when point cloud data composed of layers is transmitted. In this case, when information that may reconstruct the entire PCC data is delivered regardless of the receiver performance, the receiver is required to perform a process (data selection (sub-sampling) 28000) of selecting only data corresponding to a necessary layer after reconstructing the point cloud data through decoding. In this case, since the delivered bitstream is already decoded, the receiver aiming at low delay may cause a delay or may fail to perform decoding depending on the receiver performance.

The data selector (or sub-sampler) 28000 may be included in the reception device, and may be connected to the decoder or the like.

The transmission device may transmit a complete PCC bitstream through transcoding for low QP, using the storage space 28010. The reception device may receive the bitstream and reconstruct the complete geometry/attribute data. In addition, the geometry/attribute data may be partially selected and reconstructed through the data selector 28000 or based on sub-sampling.

In addition, when the geometry/attribute bitstream is divided and delivered in slices according to the above-described embodiments, the receiver may selectively decode the bitstream according to the density of point cloud data to be represented according to decoder performance or application field, and deliver the decoded bitstream to the decoder. In this case, information of a layer to be selected may be selected through nal_spatial_id and nal_data_type in the NAL unit header at the NAL unit stage. In this case, since the selection is performed before decoding, decoder efficiency may be increased, and decoders of various performances may be supported through one bitstream.

For example, the scalable encoder 28020 corresponds to the encoder according to the above-described embodiments. The encoder 28020 may scalably encode the geometry and/or attribute data input as a source, and may then generate a complete PCC bitstream and transmit the same or store the same in a storage space for future transmission. Alternatively, it may generate a partial PCC bitstream and transmit the bitstream or store the same in the storage space for future transmission.

The decoder 28040 corresponds to the decoder according to the above-described embodiments. Prior to the decoder 28040, the bitstream selector 28030 may selectively decode a desired portion of the data from the layer-based scalably encoded complete or partial PCC bitstream based on the NAL unit of the layer. The decoder 28040 may decode and reconstruct the partial geometry/attribute data.

Figure 29:
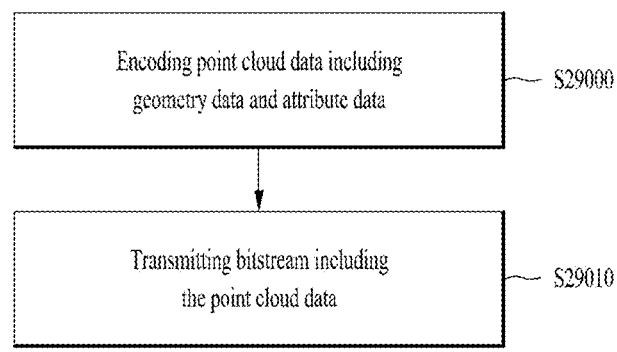
FIG. 29 illustrates a method of transmitting point cloud data according to embodiments.

FIG. 29 illustrates a method of transmitting point cloud data according to embodiments.

S29000: The method of transmitting point cloud data according to the embodiments includes encoding the point cloud data including geometry data and attribute data. The encoding operation according to the embodiments may include the operations of the encoder 1002 of FIG. 1, the encoding 20001 of FIG. 2, the encoder of FIG. 4, the encoders 12001 to 12011 of FIG. 12, the XR device 1430 of FIG. 14, the encoders 15000 and 15010 of FIG. 15, the encoders 25000 and 25010, the unit packer 25020, and the metadata generator 25030 of FIG. 25, the scalable encoder 27000 and the bitstream selector 27040 of FIG. 27, and the scalable encoder 28020 of FIG. 28.

S29010: The point cloud data transmission method according to the embodiments further includes transmitting a bitstream including the point cloud data. The transmission operation according to the embodiments includes the operations of the transmitter 10003 of FIG. 1, the transmission 20002 of FIG. 2, transmission of the geometry bitstream and/or the attribute bitstream of FIG. 4, the transmission processor 12012 of FIG. 12, the XR device 1430 of FIG. 14, transmission of the complete or partial PCC bitstream of FIG. 15, layer segmentation of the bitstream of FIG. 16, the multiplexer 25040 and the transmitter 25050 of FIG. 25, the transcoding transmission and partial PCC bitstream transmission of FIG. 27, and the transcoding transmission and complete PCC bitstream transmission of FIG. 28.

Figure 30:
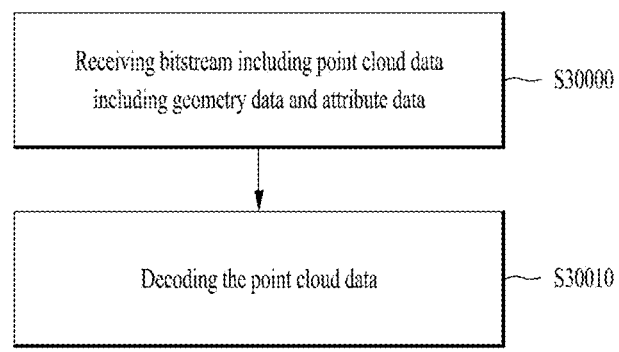
FIG. 30 illustrates a method of receiving point cloud data according to embodiments.

FIG. 30 illustrates a method of receiving point cloud data according to embodiments.

S30000: The method of receiving point cloud data according to the embodiments includes receiving a bitstream including point cloud data including geometry data and attribute data. The reception operation according to the embodiments may include the operations of the receiver 10005 of FIG. 1, reception in response to the transmission 20002 of FIG. 2, reception of the geometry/attribute bitstream of FIGS. 4 and 11, the receiver 13000 and the reception processor 13001 of FIG. 13, the XR device 1430 of FIG. 14, reception of the complete PCC bitstream and partial PCC bitstream of FIG. 15, reception of the bitstream segment layer of FIG. 16, reception of the NAL unit of FIGS. 19 to 24, the receiver 26000 and the demultiplexer 26010 of FIG. 26, reception of the partial PCC bitstream of FIG. 27, reception of the complete PCC bitstream of FIG. 28, and the like.

S30010: The point cloud data reception method according to the embodiments further includes decoding the point cloud data. The decoding according to the embodiments may include the operations of the decoder 10006 of FIG. 1, the decoding 20003 of FIG. 2, the geometry/attribute decoder of FIG. 10, the geometry/attribute decoder of FIG. 11, the decoders 13002 to 13010 of FIG. 13, the XR device 1430 of FIG. 14, the decoders 15020 and 15030 of FIG. 15, decoding of the bitstream segment layer of FIG. 16, layer matching of the segment (unit) of FIG. 18, the syntax parsing/decoding of FIGS. 19 to 24, the geometry/attribute decoders 26040 and 26050, the metadata parser 26030, and the unit parser/selector 26020 of FIG. 26, the decoder 27010 of FIG. 27, the scalable decoder/data selector (sub-sampler) 28000, the bitstream selector 28030, and the decoder 28040 of FIG. 28, and the like.

All or part of the operations in the point cloud data reception method according to the embodiments may follow a reverse process of the transmission method.

Through the point cloud compression processing process, and a combination between the PCC NAL unit and the geometry/attribute layer structure, the PCC transmitter or receiver according to the embodiments of the present disclosure may use the above-described PCC NAL unit. In addition, the geometry/attribute layer structure included in the above-described parameter set may be used. Accordingly, the PCC transmitter may increase the storage and transmission efficiency, and the PCC receiver may reduce the delay and increase the decoding efficiency.

In the present disclosure, "A/B" is used to include "A and B" and "A or B."

The embodiments have been described in terms of a method and/or a device, and the description of the method and the description of the device may be applied complementary to each other.

Although the accompanying drawings have been described separately for simplicity, it is possible to design new embodiments by combining the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In the present disclosure, "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to perform the related operation or interpret the related definition according to a specific condition when the specific condition is satisfied.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

MODE FOR INVENTION

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

The invention claimed is:

1. A method of transmitting point cloud data, the method comprising:
    encoding point cloud data including geometry data and attribute data; and
    transmitting a bitstream including the point cloud data,
    wherein a bitstream for the geometry data includes Network Abstract Layer (NAL) units,
    wherein each NAL unit includes geometry data in each depth of a tree related to the geometry data,
    wherein a bitstream for the attribute data includes Network Abstract Layer (NAL) units, and
    wherein each NAL unit includes attribute data in each Level of Detail (LOD) related to the attribute data.

2. The method of claim 1,
    wherein the bitstream includes signaling information for one or more slices for the geometry data and the attribute data.

3. The method of claim 1,
    wherien the geometry bitstream is segmented based on the depth of the tree,
    wherein the attribute bitstream is segmented based on the LOD,
    wherien the tree is an octree structure, and
    wherein the attribute data are included in the LOD.

4. The method of claim 2,
    wherein the NAL unit includes header information.

5. An apparatus for transmitting point cloud data, the apparatus comprising:
    an encoder configured to encode point cloud data including geometry data and attribute data; and
    a transmitter configured to transmit a bitstream including the point cloud data,
    wherein a bitstream for the geometry data includes Network Abstract Layer (NAL) units,
    wherein each NAL unit includes geometry data in each depth of a tree related to the geometry data,
    wherein a bitstream for the attribute data includes Network Abstract Layer (NAL) units, and
    wherein each NAL unit includes attribute data in each Level of Detail (LOD) related to the attribute data.

6. The apparatus of claim 5,
    wherien the geometry bitstream is segmented based on the depth of the tree,
    wherein the attribute bitstream is segmented based on the LOD, and
    wherein the bitstream includes signaling information for one or more slices for the geometry data and the attribute data.

7. The apparatus of claim 6,
    wherien the tree is an octree structure, and
    wherein the attribute data are included in the LOD.

8. The apparatus of claim 6,
    wherein the NAL unit includes header information.

9. A method of receiving point cloud data, the method comprising:
    receiving a bitstream including point cloud data including geometry data and attribute data;
    decoding the point cloud data,
    wherein a bitstream for the geometry data includes Network Abstract Layer (NAL) units,
    wherein each NAL unit includes geometry data in each depth of a tree related to the geometry data,
    wherein a bitstream for the attribute data includes Network Abstract Layer (NAL) units, and
    wherein each NAL unit includes attribute data in each Level of Detail (LOD) related to the attribute data.

10. The method of claim 9,
    wherein the bitstream includes signaling information for one or more slices for the geometry data and the attribute data.

11. The method of claim 9,
    wherien the tree is an octree structure,
    wherein the attribute data are included in the LOD,
    wherein the bitstream includes a geometry bitstream including the geometry data and an attribute bitstream including the attribute data,
    wherien the geometry bitstream is segmented based on the depth of the tree, and
    wherein the attribute bitstream is segmented based on the LOD.

12. The method of claim 10,
    wherein each NAL unit in the bitstream for the geometry data is matched to each depth for the tree,
    wherein each NAL unit in the bitstream for the attribute data is matched to each LOD, and
    wherein the NAL unit includes header information.

13. An apparatus for receiving point cloud data, the apparatus comprising:
    a receiver configured to receive a bitstream including point cloud data including geometry data and attribute data;
    a decoder configured to decode the point cloud data,
    wherein a bitstream for the geometry data includes Network Abstract Layer (NAL) units,
    wherein each NAL unit includes geometry data in each depth of a tree related to the geometry data,
    wherein a bitstream for the attribute data includes Network Abstract Layer (NAL) units, and
    wherein each NAL unit includes attribute data in each Level of Detail (LOD) related to the attribute data.

14. The apparatus of claim 13,
    wherien the geometry bitstream is segmented based on the depth of the tree, and
    wherein the attribute bitstream is segmented based on the LOD, and
    wherein the bitstream includes signaling information for one or more slices for the geometry data and the attribute data.

15. The apparatus of claim 14,
    wherien the tree is an octree structure,
    wherein the attribute data are included in the LOD,
    wherein each NAL unit in the bitstream for the geometry data is matched to each depth fo the tree,
    wherein each NAL unit in the bitstream for the attribute data is matched to each LOD, and
    wherein the NAL unit includes header information.

* * * * *